United States Patent
Rudy

(10) Patent No.: US 10,846,495 B2
(45) Date of Patent: Nov. 24, 2020

(54) MEASUREMENT SYSTEM

(71) Applicant: Manitowoc Crane Companies, LLC, Manitowoc, WI (US)

(72) Inventor: John R. Rudy, Greencastle, PA (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 0 days.

(21) Appl. No.: 16/233,899

(22) Filed: Dec. 27, 2018

(65) Prior Publication Data
US 2019/0205579 A1 Jul. 4, 2019

Related U.S. Application Data

(60) Provisional application No. 62/616,182, filed on Jan. 11, 2018, provisional application No. 62/611,736, filed on Dec. 29, 2017.

(51) Int. Cl.
| | | |
|---|---|---|
| *G06K 7/08* | (2006.01) | |
| *G06K 7/10* | (2006.01) | |
| *G06K 19/07* | (2006.01) | |
| *G01S 13/87* | (2006.01) | |
| *G01S 13/88* | (2006.01) | |

(Continued)

(52) U.S. Cl.
CPC ......... *G06K 7/10366* (2013.01); *B66C 13/46* (2013.01); *G01D 5/48* (2013.01); *G01S 13/751* (2013.01); *G01S 13/876* (2013.01); *G01S 13/88* (2013.01); *G06K 19/0723* (2013.01); *G01D 5/249* (2013.01); *G01D 5/2455* (2013.01)

(58) Field of Classification Search
CPC ............ G06K 7/10366; G06K 19/0723; B66C 13/46; G01D 5/48; G01D 5/2455; G01D 5/249; G01S 13/751; G01S 13/876; G01S 13/88

USPC ................................................. 235/451, 383
See application file for complete search history.

(56) References Cited

U.S. PATENT DOCUMENTS 7,142,124 B2 11/2006 Chi et al.
7,714,741 B2 5/2010 Snider et al.
(Continued)

FOREIGN PATENT DOCUMENTS

EP 1772415 A2 4/2007
EP 2263966 A1 12/2010
(Continued)

OTHER PUBLICATIONS

Extended European Search Report issued by EPO in connection with EP18000998 dated Apr. 24, 2019.

*Primary Examiner* — Karl D French
(74) *Attorney, Agent, or Firm* — Levenfeld Pearlstein, LLC

(57) ABSTRACT

A measurement system includes a plurality of RFID tags, each RFID tag configured to output tag information, each RFID tag having a width and spaced from an adjacent RFID tag by a pitch, a single RFID reader configured to read the tag information from at least one RFID tag of the plurality of RFID tags and a plate having a window disposed between the RFID reader and the plurality of RFID tags, wherein the window is dimensioned to control a transmission range between the RFID tags and the RFID reader. The system further includes a carrier to which the plurality of RFID tags are mounted and a control system configured to determine a position of the at least one RFID tag based on the tag information.

17 Claims, 22 Drawing Sheets

(51) Int. Cl.
  *G01S 13/75*   (2006.01)
  *G01D 5/48*    (2006.01)
  *B66C 13/46*   (2006.01)
  *G01D 5/249*   (2006.01)
  *G01D 5/245*   (2006.01)

(56) References Cited

U.S. PATENT DOCUMENTS

| | | |
|---|---|---|
| 8,181,798 B2 | 5/2012 | Moller |
| 8,334,687 B2 | 12/2012 | Ma et al. |
| 8,344,856 B2 | 1/2013 | Noda |
| 8,777,027 B2 | 7/2014 | Morath |
| 9,244,153 B2 | 1/2016 | Zomcheck et al. |
| 9,249,626 B2 | 2/2016 | Flusche |
| 9,365,398 B2 | 6/2016 | Benton et al. |
| 2005/0087602 A1* | 4/2005 | Scannell .............. G01D 5/2492 |
| | | 235/462.01 |
| 2009/0101447 A1 | 4/2009 | Durham et al. |
| 2012/0160916 A1 | 6/2012 | Galm et al. |
| 2012/0326885 A1 | 12/2012 | Mccarty |
| 2013/0131863 A1* | 5/2013 | Hoersten ................ G07F 9/026 |
| | | 700/236 |

FOREIGN PATENT DOCUMENTS

| | | |
|---|---|---|
| JP | 2007008638 A | 1/2007 |
| WO | 2017023735 A1 | 2/2017 |

\* cited by examiner

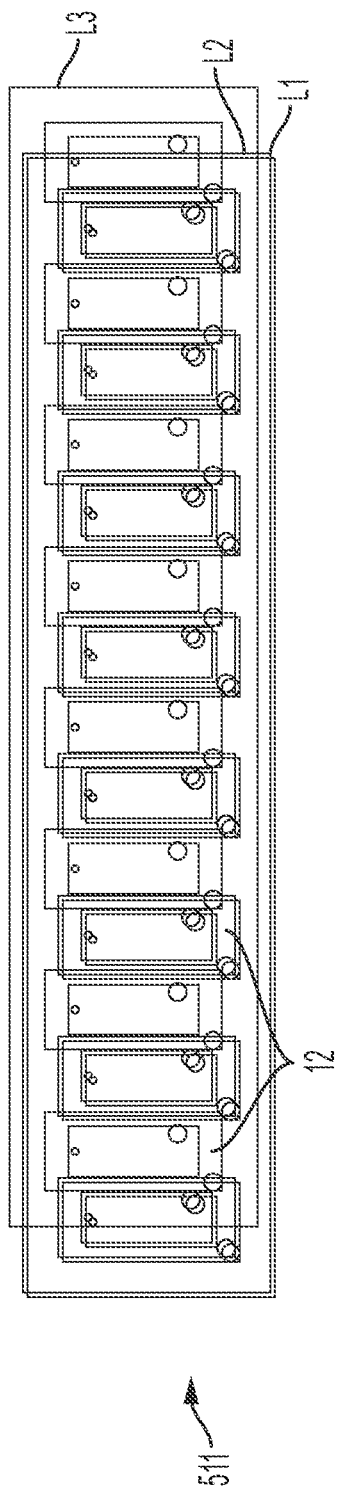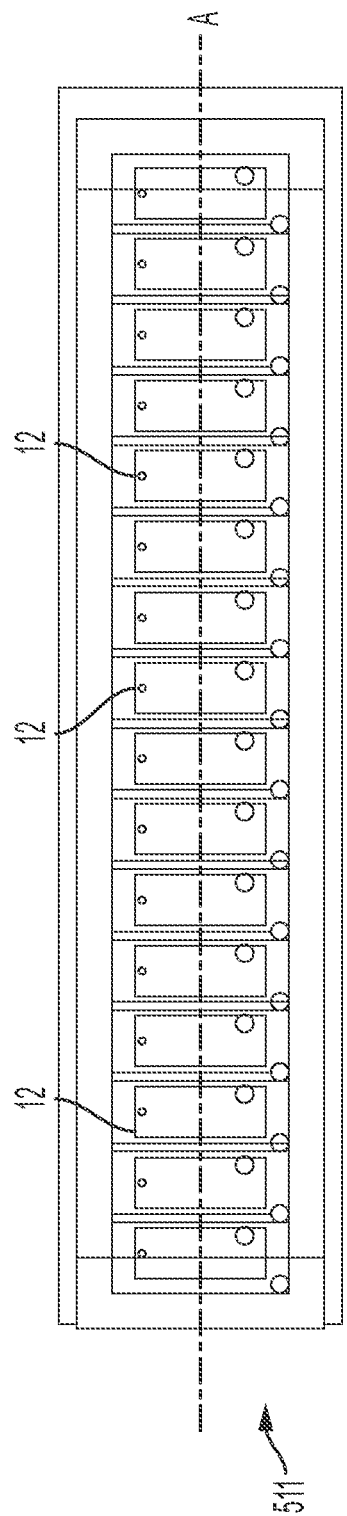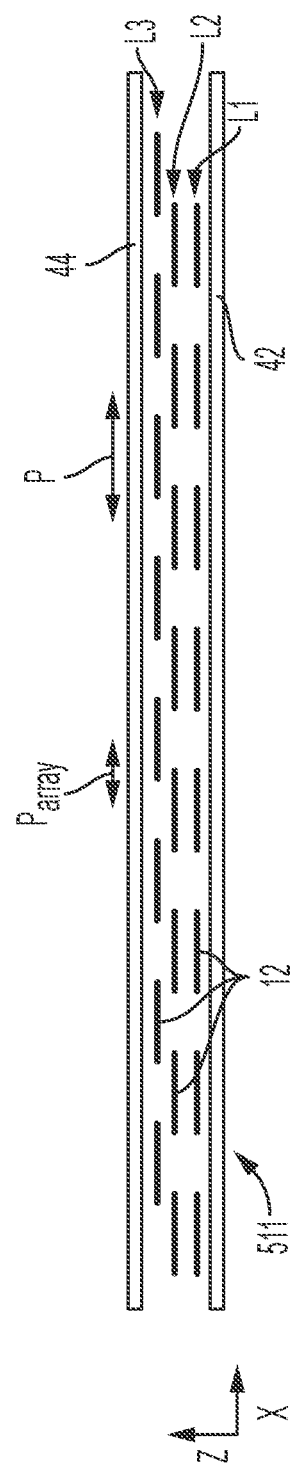
FIG. 11
FIG. 12
FIG. 13

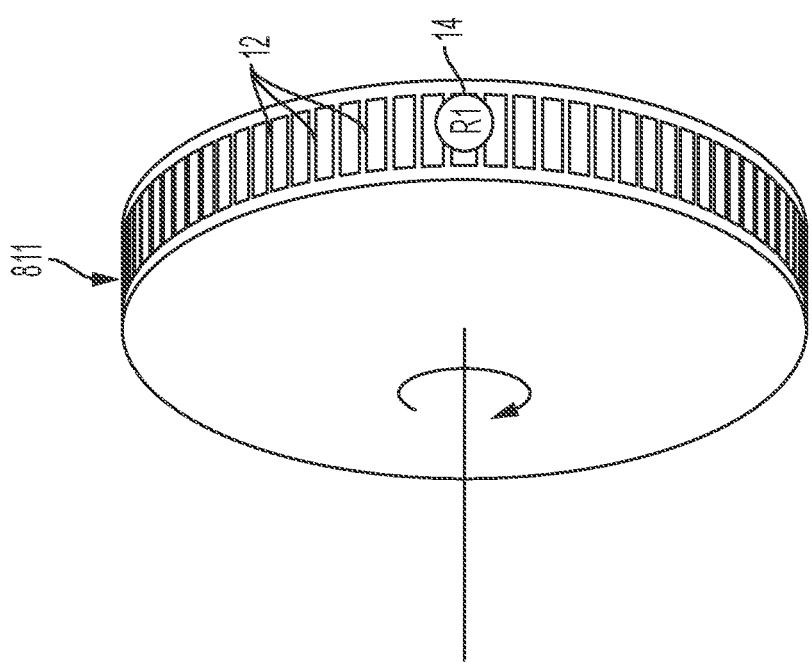

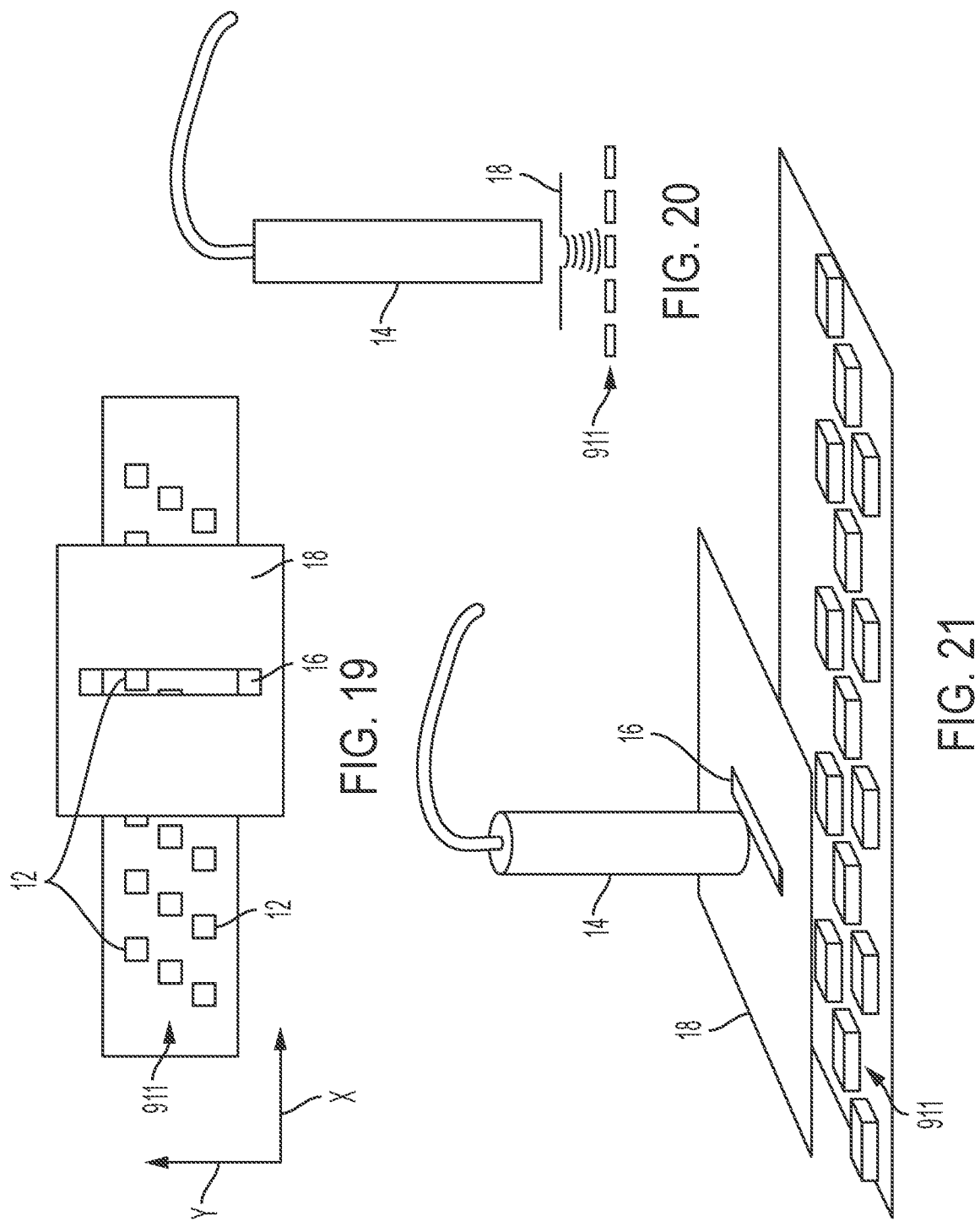

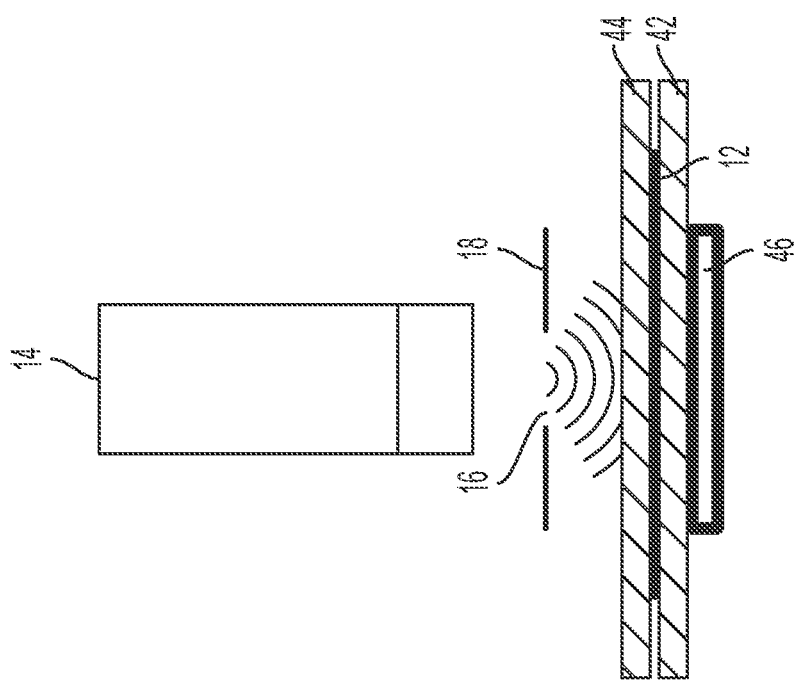

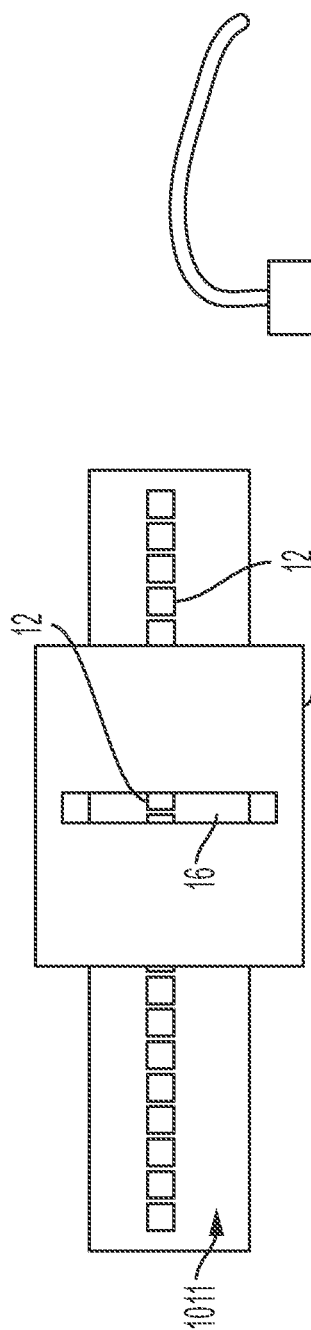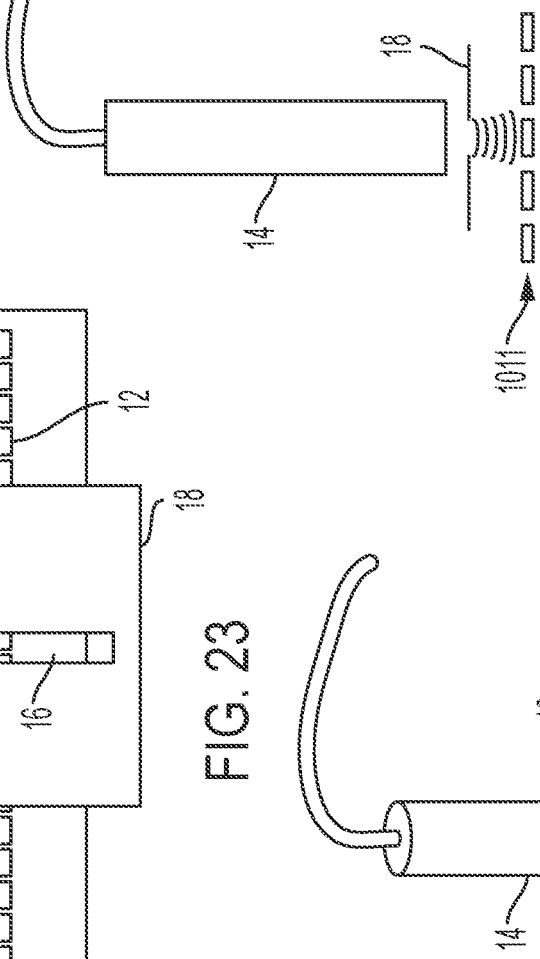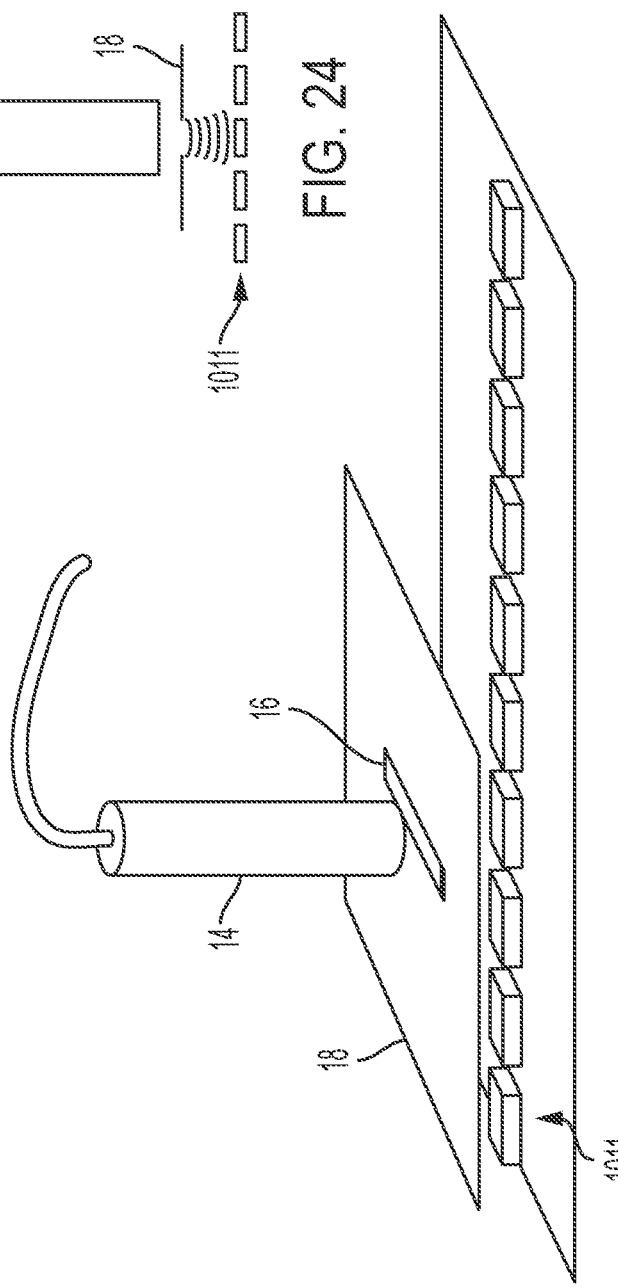

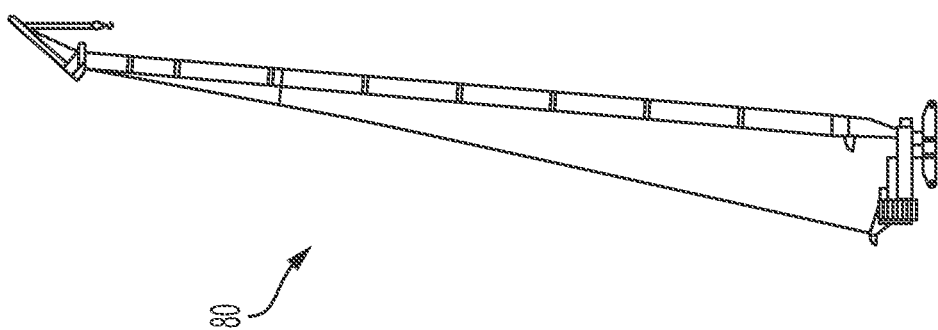

MEASUREMENT SYSTEM

FIELD

The present disclosure relates to a measurement system for determining a position of a movable component.

BACKGROUND

Measurement systems for determining linear and/or rotational positions of movable components are known. Such systems include, for example, string pots, magnetic systems, lasers, ultrasonic magnetostrictive and magneto resistive systems. However, these systems have been found to be overly complex, lack durability, lack reliability, and/or may be costly Another known measurement incorporates RFID tags and a RFID reader. The RFID tags emit a signal having identification information which can be received by the RFID receiver. The identification information may include position information or be associated with a table stored in a memory where corresponding position information may be stored for each RFID tag. Accordingly, the corresponding position information may be retrieved from the table based on the received identification information.

One such RFID measurement system is described in U.S. Pat. No. 8,777,027 to Morath, in which a position of a stabilizer plate is determined by transponders positioned at predetermined intervals on a telescoping part cooperating with a receiver device arranged on a fixed-position part. However, in Morath, each transponder is only configured to detect a limited number of positions, such as fully extended, partially extended or retracted positions. Thus, precise and accurate measurements of intermediate positions are not obtained using this measurement system. In addition, depending on the spacing between the transponders and the power of the transponders, the receiver may not detect a transponder when the transponder is not sufficiently close to the receiver. In such a scenario, it is difficult to measure a position of the component.

In addition, in a known RFID system having a single RFID reader, a single RFID tag is detected by the reader over a period of time as the RFID tags move relative to the reader. Thus, the RFID reader detects the same RFID tag over a range of positions, and turn, the system determines the position of the detected RFID tag to be constant based on the received position or identification information, even though the actual position of the RFID tag has changed. Thus, such an RFID system may not be suitably accurate.

Another RFID measurement system is disclosed in EP 2 263 966 A1 for an industrial truck, in which at least one RFID tag is arranged on a first member and at least one RFID reader is arranged on a second member, and a control system determines the position of the first member based on information stored in the at least one RFID tag. The RFID tags may be disposed in several rows to allow more tags to be read over a fixed length, thereby increasing a number of positions that may be determined. However, applying RFID tags over several rows on the industrial truck requires a sufficiently large amount of available surface area. In addition, such a configuration results in a larger area over which RFID tags are exposed to external elements and increases the likelihood of inadvertent damage to the tags. Further, the RFID measurement system in EP 2 263 966 may be not suitably durable for use on equipment in typically rugged environments, such as construction equipment at a worksite.

Accordingly, there is a need for a durable, reliable and relatively low-cost position measurement system for accurately and precisely determining a position of a movable component.

SUMMARY

A measurement system includes a plurality of RFID tags, each RFID tag configured to output tag information, each RFID tag having a width and spaced from an adjacent RFID tag by a pitch, a single RFID reader configured to read the tag information from at least one RFID tag of the plurality of RFID tags, and a plate having a window disposed between the RFID reader and the plurality of RFID tags. The window is dimensioned to control a transmission range between the RFID tags and the RFID reader. The system further includes a carrier to which the plurality of RFID tags are mounted, and a control system configured to determine a position of the at least one RFID tag based on the tag information.

According to another aspect, a measurement system for determining a position of a movable component, the movable component being one of a first component and second component movable relative to the other of the first component and the second component. The system includes a plurality of RFID tags arranged on one of the first component and the second component, each tag configured to output a signal. The RFID tags are arranged on carrier. An RFID reader is arranged on the other of the first component or the second component and configured to read the signal. A plate having a window is disposed between the RFID reader and the plurality of RFID tags. The window is dimensioned to control a transmission range between the RFID tags and the RFID reader. A control system is operatively connected to the reader, the control system configured to determine a position of an RFID tag of the plurality of RFID tags based on the signal.

These and other features and advantages of the present invention will be apparent from the following detailed description, in conjunction with the appended claims.

BRIEF DESCRIPTION OF THE DRAWINGS

FIG. 11 is an exploded view of an RFID tag array according to another embodiment;

FIG. 12 is a plan view of the RFID tag array of FIG. 11;

FIG. 13 is a diagram representing a side cross-sectional view of the RFID tag array of FIG. 11;

FIG. 18 is a perspective view of an RFID tag array according to another embodiment;

FIG. 19 is a plan view showing a portion of a measurement system according to an embodiment;

FIG. 20 is a side view of the measurement system of FIG. 19;

FIG. 21 is a perspective view of the measurement system of FIG. 19;

FIG. 22 is a front cross-sectional view of a measurement system according to an embodiment;

FIG. 23 is a plan view showing a portion of a measurement system according to another embodiment;

FIG. 24 is a side view of the measurement system of FIG. 23;

FIG. 25 is a perspective view of the measurement system of FIG. 23;

FIG. 32 is an example of a crawler crane on which a measurement system may be installed.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
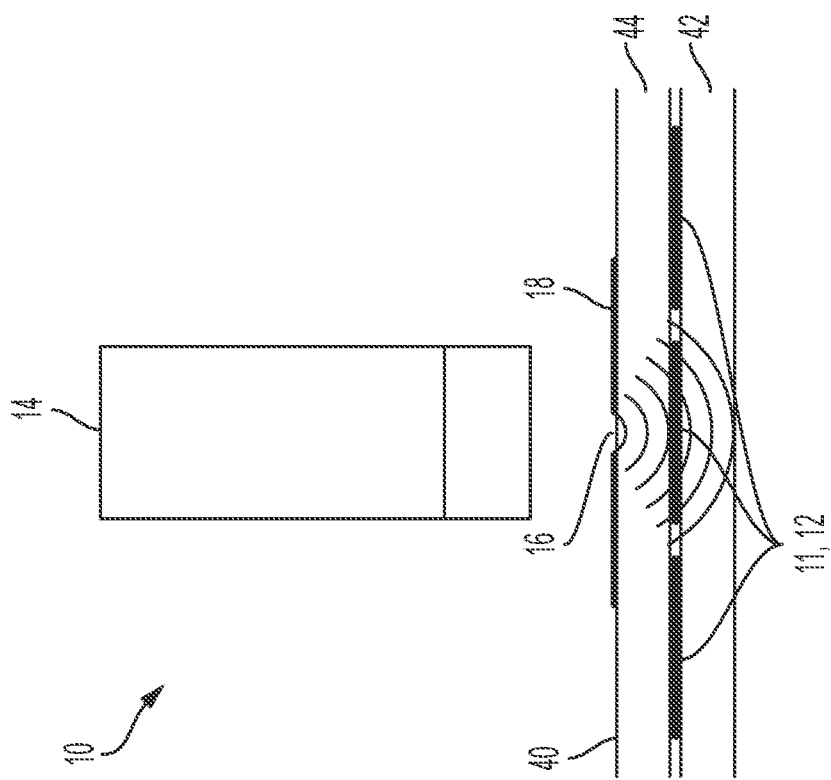
FIG. 1 is a diagram of a measurement system according to an embodiment.

FIG. 1 is a diagram of a measurement system 10 according to an embodiment. The measurement system 10 includes an RFID tag array 11 comprising a plurality of RFID tags 12 and at least one RFID reader 14. In one embodiment, the measurement system 10 includes only a single RFID reader 14. In another embodiment, multiple RFID readers 14 may be used.

In one embodiment, the array 11 may be disposed on or in a carrier 40. The carrier 40 generally includes at least one of a base 42 and a cover 44. In one embodiment, the base 42 is configured to be secured to a first component (not shown in FIG. 1) and disposed between the first component and the array 11. The cover 44 may optionally be disposed on an opposite side of the array 11 from the base 42.

In one embodiment, the base 42 and the cover 44 may be made from non-metallic materials, and in an embodiment, a durable, wear-resistant material such as a plastic or a hard plastic. Other suitable polymers and similar materials may be used as well, including materials that are robust, easily manufacturable, low cost, water resistant, easily handled, or some combination thereof. In another embodiment, the cover 44 may be made from a layer of paint, sealant or tape applied over the RFID tags 12 and the base 42. In one embodiment, the base 42 and the cover 44 may be adhered to one another with, for example, an adhesive, mechanical fastener or other suitable fastener. In one embodiment, a sealant layer may substantially encapsulate the array between the base 42 and the cover 44 to substantially prevent exposure of the RFID tags 12 to external elements. In one embodiment, the sealant layer may secure the cover 44 to the base 42.

The carrier 40 can be manufactured to any suitable length or shape to substantially enclose and/or support the RFID tags 12. Preferably, all of the RFID tags 12 of the measurement system 10 are disposed on or in the carrier 40, but the present disclosure is not limited to such an embodiment. For example, in some embodiments, multiple carriers 40 may be used to enclose or support the RFID tags 12. In one embodiment, multiple carriers 40 may be placed end-to-end or side-by-side to enclose or support the RFID tags 12. This configuration may be useful, for example to allow for adjustment of a length or area to be covered by the RFID tags 12, i.e., a length or area over which measurements may be determined by reading the RFID tags 12. In addition, to obtain a desired length or area, the carrier 40 may be cut to a length and/or width as desired.

Further, in one embodiment, a window 16 may be disposed between the RFID reader 14 and the array 11. For example, in one embodiment, the window 16 may be formed in a plate 18 that is affixed to or formed integrally with the RFID reader 14. In another embodiment, the plate 18 may be disposed on or formed integrally with a component positioned between the RFID reader 14 and the array 11. The window 16 is dimensioned to control a range of signal transmission between the RFID tags 12 and the RFID reader 14. The dimensions of the window 16 may be varied, for example, during manufacture or in a post-manufacturing procedure, such that the signal transmission range may be controlled in a manner desired by the end user. In some embodiments, a plate 18 in which the window 16 is formed may be removable and interchangeably replaced with one or more other plates 18 having differently dimensioned windows 16. The plate 18 is preferably made from a metallic material, such as aluminum, to substantial inhibit transmission of signals between the RFID tags 12 and the RFID reader 14, at areas other than the window 16. In one embodiment, aluminum foil may be used for the plate 18.

A number of tags 12 sensed by the reader 14 at a given time may be limited based on the dimensions of the window 16. For example, a smaller window 16 results in lower energy output and a lower number of RFID tags 12 being energized by the reader 14, whereas a larger window 16 allows for higher energy output and a higher number of tags 12 being energized.

Figure 2:
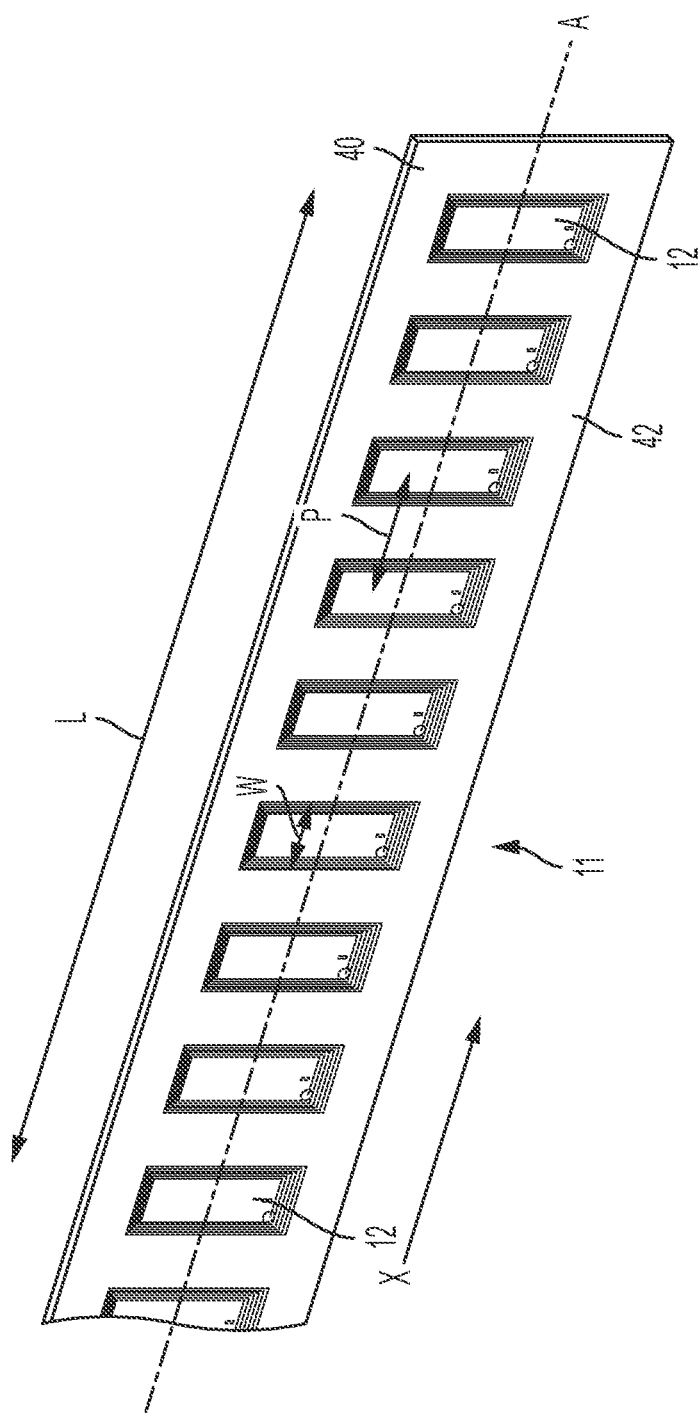
FIG. 2 is a perspective view of an RFID tag array according to an embodiment.

The array 11 may be formed having a variety of RFID tag 12 arrangements, depending, for example, on particular or desired application of the measurement system 10. FIG. 2 is a perspective view of an array 11 according to an embodiment. For example, in one embodiment, the array 11 may include a plurality of RFID tags 12 arranged generally along a line 'A' extending a first direction, shown as the 'X' direction in FIG. 2. In one embodiment, the RFID tags 12 are aligned with one another on the line A. In one embodiment, the RFID tags 12 may extend in a single row and define a length 'L' of the array 11. The array 11 may be disposed on the carrier 40.

Referring still to FIG. 2, in one embodiment, the RFID tags 12 may be arranged having a common orientation relative to the length L of the array 11. For example, the RFID tags 12 may be arranged having widths 'W' of the tags 12 extending in the length L of the array 11. In one embodiment, the RFID tags 12 may be spaced apart by a predetermined distance in the length L of the array 11. That is, the RFID tags 12 may be arranged having a center-to-center pitch 'P' between adjacent tags 12. The pitch P may be limited, for example, by the width W of the tags 12. Accordingly, for a given length L of the array 11, the number of tags 12 in the array 11 is based, at least in part, on the width W of each tag 12 and the pitch P between respective centers of adjacent tags 12.

Figure 3:
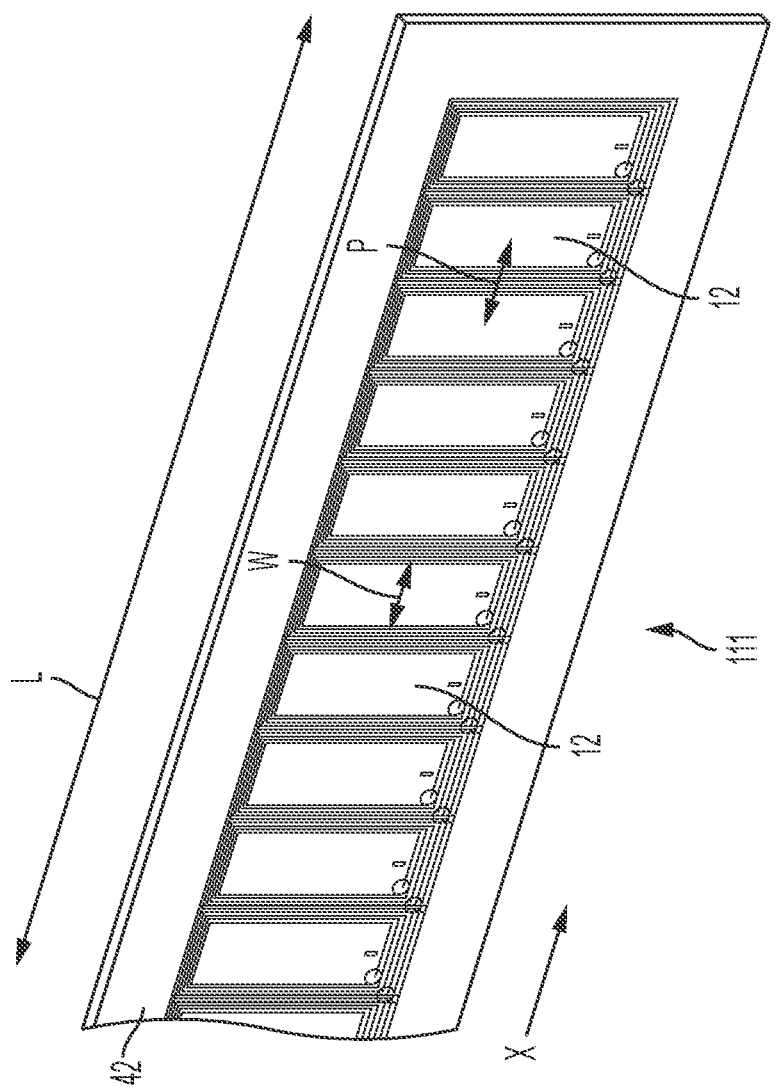
FIG. 3 is a perspective view of an RFID tag array according to another embodiment.

FIG. 3 is a perspective view of an RFID tag array 111 according to another embodiment. As shown in FIG. 3, in an embodiment where the RFID tags 12 have the same widths W as those in embodiment of FIG. 2, the pitch P may be reduced, for example, until edges of adjacent RFID tags 12 abut one another. In such an arrangement, the pitch P is equal to, or approximately equal to the width W of an RFID tag 12.

Figure 4:
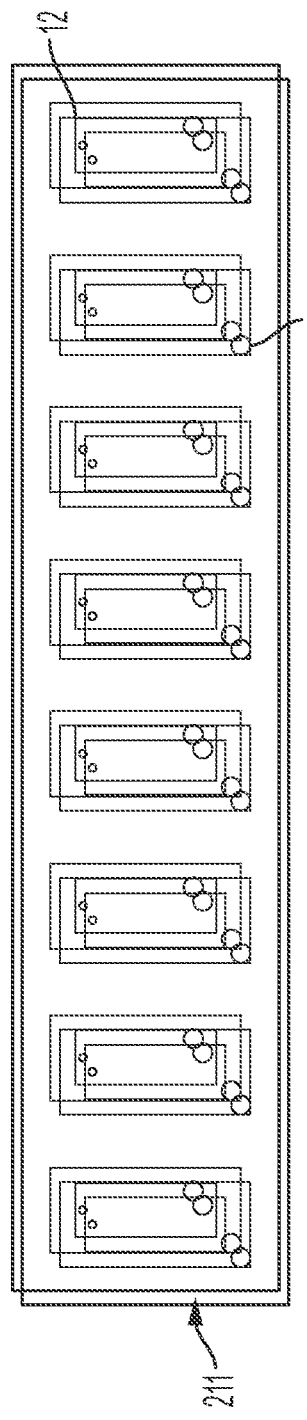
FIG. 4 is an exploded view of an RFID tag array according to another embodiment.
Figure 5:
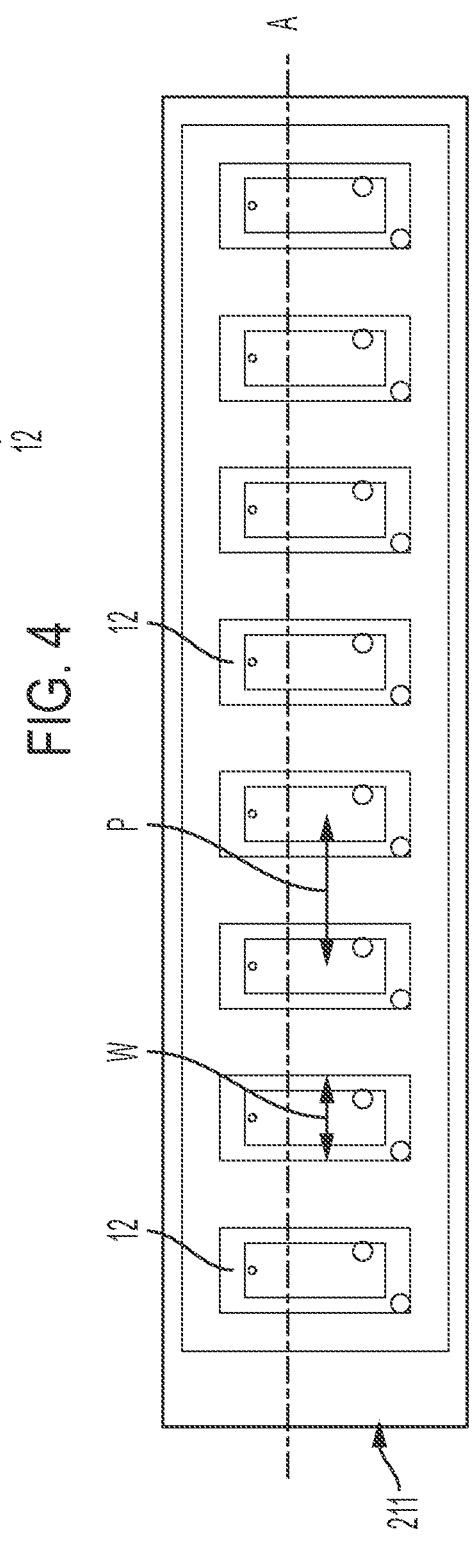
FIG. 5 is a plan view of the RFID tag array of FIG. 4.
Figure 6:
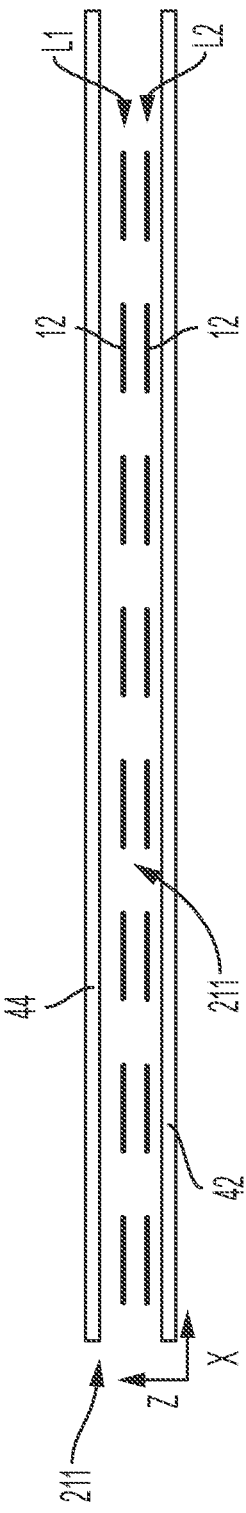
FIG. 6 is a diagram representing a side cross-sectional view of the RFID tag array of FIG. 4.

FIGS. 4-6 show different views of an array 211 according to another embodiment. For example, the array 211 may include a plurality of RFID tags 12 each having a width W, spaced apart by a predetermined pitch P, arranged in a row along a line A extending, for example, in the X direction. In addition, the array 211 may have the RFID tags 12 arranged as a row in first layer L1 and a second layer L2, positioned along the line A but offset from the first layer in a Z direction, perpendicular to the X direction. That is, the first and second layers L1, L2 of RFID tags 12 may be arranged in a stacked configuration. In one embodiment, the RFID tags 12 of the first and second layers L1, L2 are positioned at substantially the same locations along the X direction. Said differently, a pitch P and position of the RFID tags 12 in the X direction is the same in the first layer L1 and the second layer L2. In the array 211, the stacked configuration is configured to provide a redundancy or backup function in the event one of the RFID tags 12 does not transmit information as intended.

Figure 7:
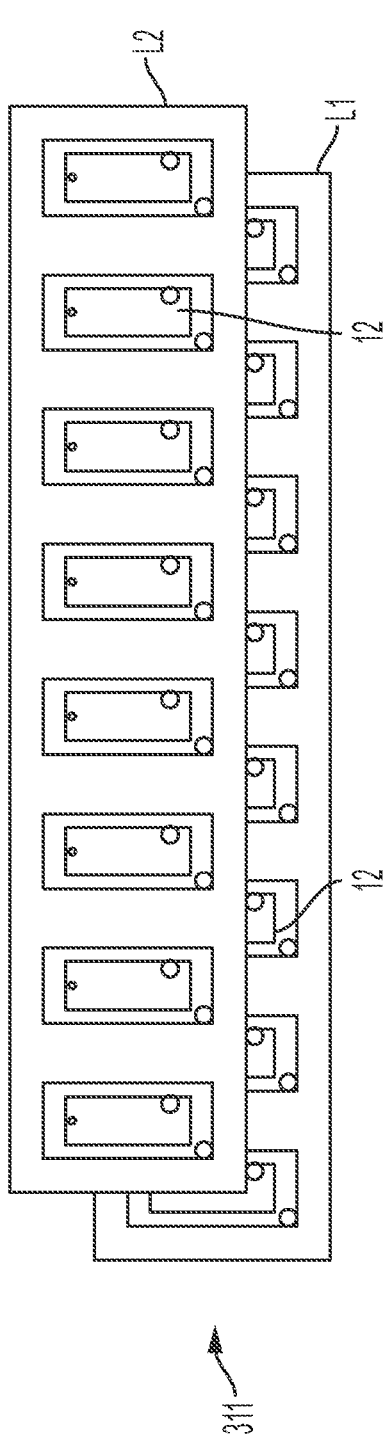
FIG. 7 is an exploded view of an RFID tag array according to another embodiment.
Figure 8:
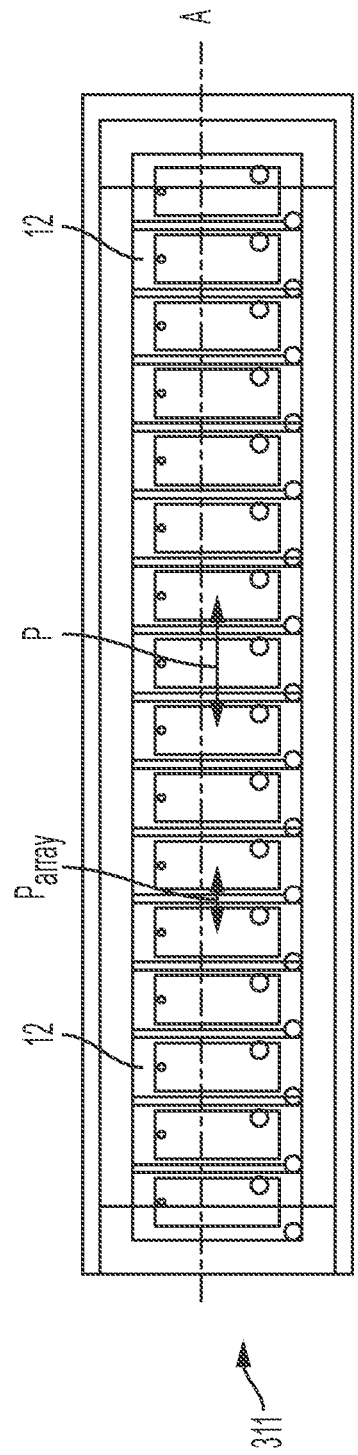
FIG. 8 is a plan view of the RFID tag array of FIG. 7.
Figure 9:
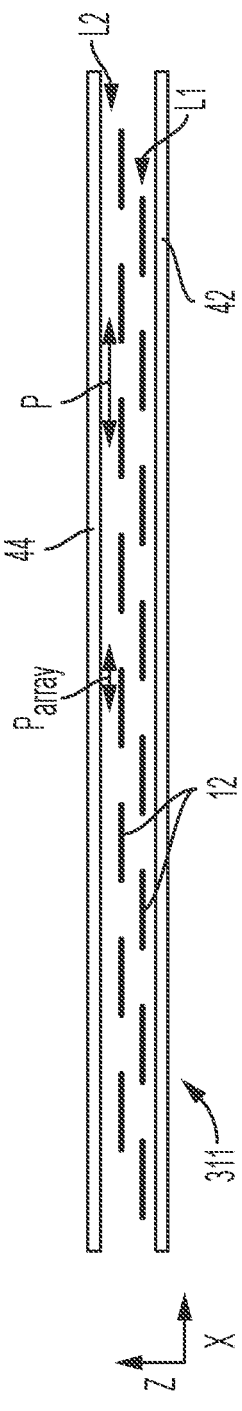
FIG. 9 is a diagram representing a side cross-sectional view of the RFID tag array of FIG. 7.

Referring to FIGS. 7-9, an array 311, according to another embodiment, may be formed substantially the same as the array 211 described above with reference to FIGS. 4-6, except that in the array 311, the first layer L1 and second layer L2 are offset relative to one another in the X direction. That is, the RFID tags 12 of the first layer L1 and the second layer L2 may have the same pitch P, but the positions of the RFID tags 12 in the second layer L2 are offset in the X direction from the positions of the RFID tags 12 in the first layer L1. Accordingly, an effective pitch of the array 'P$_{array}$' which is less than the pitch P of each layer L1, L2 may be provided, based on the distance between a center of an RFID tag 12 in the first layer L1 and the nearest center of another RFID tag 12 in the X direction, which in this example, is an RFID tag 12 of the second layer L2, offset from the RFID tag 12 of the first layer L1.

Figure 10:
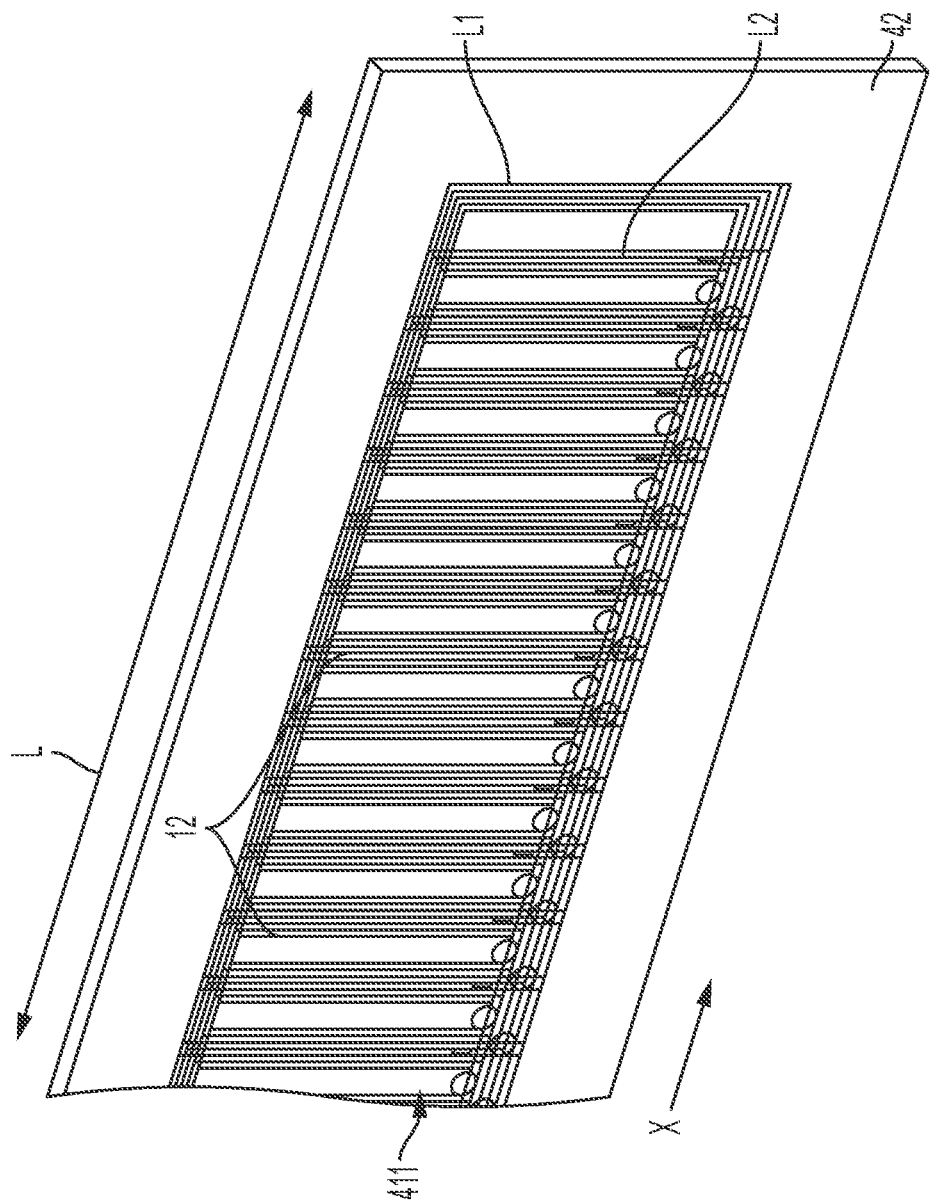
FIG. 10 is a perspective view of an RFID tag array according to another embodiment.

FIG. 10 is a perspective view of an RFID tag array 411 according to another embodiment. The array 411 is similar to the array 311 described with respect to FIGS. 6-9 above, except that in the array 411, the RFID tags 12 of each layer L1, L2 are disposed in abutting relationship with one another in the X direction. Accordingly, the pitch P between adjacent tags 12, as well as an effective pitch of the array P$_{array}$, may be minimized.

FIGS. 11-13 are different views of an array 511 according to another embodiment. The array 511, according to one embodiment, includes some features similar to those described above with respect to the array 211 in FIGS. 4-6 and other features similar to those described above with respect to the array 311 in FIGS. 7-9. For example, the RFID tags 12 of the array 511 may be positioned in a row along the line A. In addition, the array 511 may include first and second layers L1, L2 of RFID tags 12 in a stacked configuration. In one embodiment, RFID tags 12 of the first layer L1 are RFID tags 12 of the second layer L2 are located at the same positions in the X direction and have the same pitch P between adjacent tags 12, similar to the tags 12 in the first and second layers L1, L2 of the array 211 above.

In addition, the array 511 may include a third layer L3 of RFID tags 12, extending along the line A and having a pitch P which is equal to or substantially equal to the pitch P of the first and second layers L1, L2. However, the third layer L3 may be offset in the X direction relative to the first and second layers L1, L2, in a manner similar to the second layer L2 in the array 311 described above. Accordingly, the array 511 includes RFID tags 12 positioned in way to provide an effective array pitch P$_{array}$, which is less than the pitch of the RFID tags 12 in an individual layer L1, L2, L3.

Figure 14:
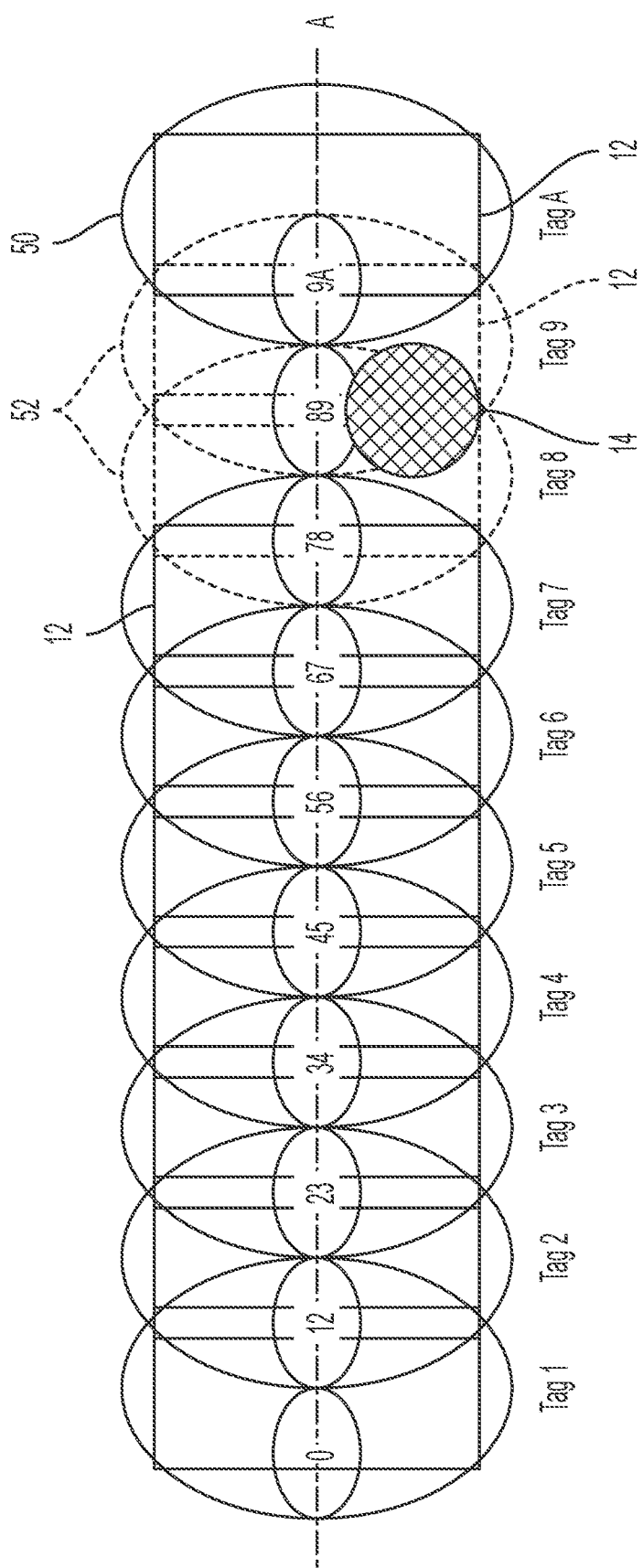
FIG. 14 is a diagram an RFID tag array with a read area and energized read area of each tag superimposed thereon, according to an embodiment.
Figure 15:
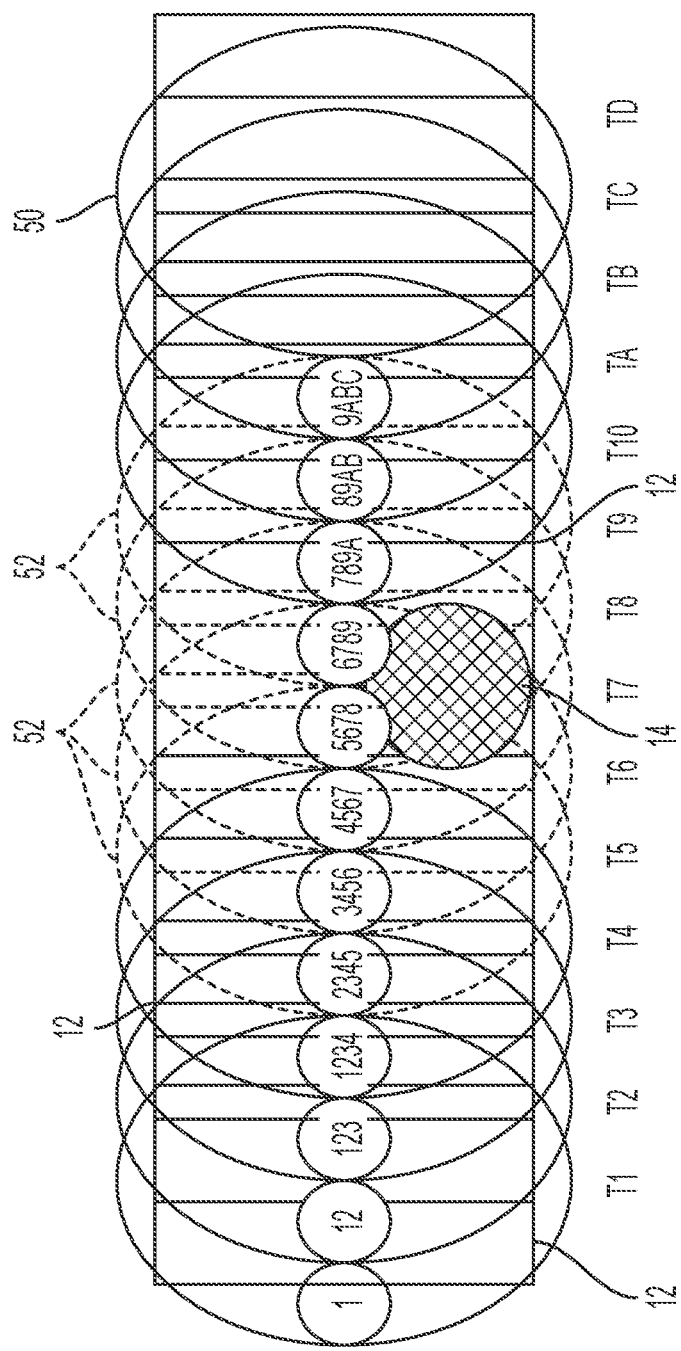
FIG. 15 is a diagram showing an RFID tag array with a read area and energized read area of each tag superimposed thereon, according to an embodiment.

FIGS. 14 and 15 are plan view diagrams showing examples of RFID tag arrays having RFID tags 12 arranged in a row along the line A. The arrays shown in FIGS. 14 and 15 may be substantially similar to any of the arrays described in the embodiments above. However, for the purposes of illustration, a pitch P in the array of FIG. 14 and a pitch P in the array of FIG. 15 may be different from one another, and/or from the examples described above. The pitch P shown in FIGS. 14 and 15 may also refer to the effective array pitch P$_{array}$.

Referring to FIGS. 14 and 15, a read range of each RFID tag 12 is generally represented with an oval shape 50, while an RFID tag 12 energized by the RFID reader 14 is generally represented with a broken-line oval shape 52. In one embodiment, the RFID tags 12 may be arranged having a 0.5 inch pitch. In the embodiment of FIG. 15, the RFID tags 12 may be arranged having a 0.25 inch pitch. It is understood that these configurations are provided for the purpose of illustration, and the present disclosure is not limited to these configurations. For example, in one embodiment, the RFID tags 12 may be arranged having a 1.0 inch pitch, a larger pitch or a smaller pitch, as desired by an end user and/or according to a particular application.

In one embodiment, the RFID reader 14 energizes and reads one or more RFID tags 12 when the RFID reader 14 is within the read range of the one or more RFID tags 12. For example, in one embodiment, as shown in FIG. 14, the RFID reader 14 may energize and read two RFID tags 12 simultaneously or nearly simultaneously.

The ability to read two or more RFID tags 12 simultaneously or near simultaneously is due in part to the relatively small pitch between adjacent RFID tags 12, which allows for at least two RFID tags 12 to be in range of the RFID reader 14 and thus, may be detected and read by the reader 14. Additionally, the RFID reader 14 of the embodiments described herein is configured to receive and process information from multiple RFID tags 12 simultaneously or near simultaneously. In this manner, a more accurate reading may be obtained.

In some embodiments, the measurement system 10 may include two RFID readers 14 to offset the pitch of the RFID tags 12. In addition, each RFID reader 14 of the two RFID readers 14 may read multiple RFID tags 12 simultaneously or near simultaneously, which may further improve accuracy as described above.

Figure 16:
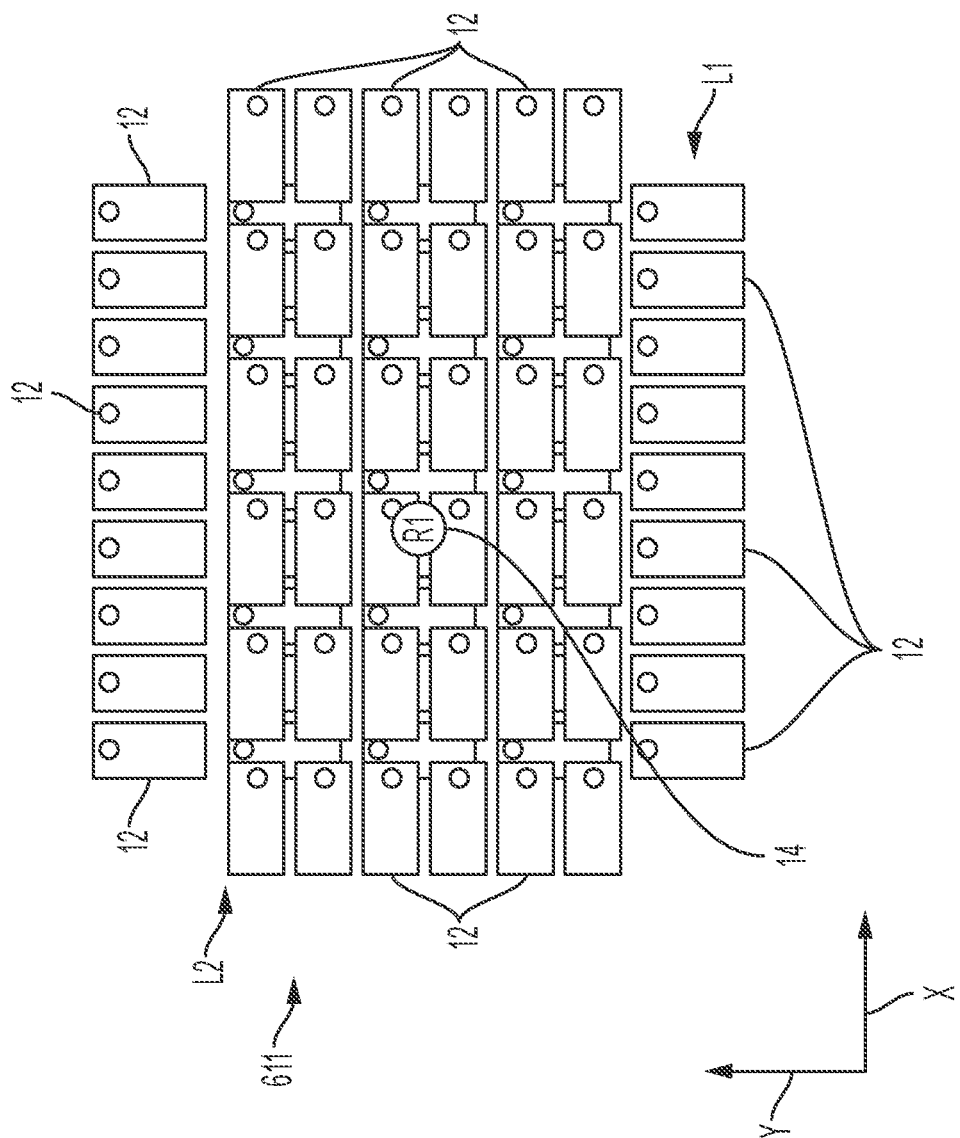
FIG. 16 is a plan view of an RFID tag array according to another embodiment.

FIG. 16 shows an array 611 according to another embodiment. In FIG. 16, the array 611 may include RFID tags 12 arranged in a first plurality of rows extending in a first direction, shown as the X direction in FIG. 16. The plurality of rows may be spaced apart from one another in the Y direction. In one embodiment, at least two rows of the first plurality of rows are parallel to one another. In one embodiment, a spacing between the rows of the first plurality of rows is the same. Alternatively, the spacing between rows may vary. Further, in one embodiment, the pitch between RFID tags 12 of each row may be equal and the RFID tags 12 of each row may be positioned at substantially the same positions along the X direction, such that each RFID tag 12 is substantially aligned with the RFID tags in a row extending in the X direction and an RFID tag 12 of the other rows in the Y direction. However, variations are envisioned. For example, one or more rows of the plurality of rows may be have RFID tags 12 offset from RFID tags 12 of another row in the X direction. Further, in one embodiment, the pitch P between RFID tags 12 may vary within a row or in different rows.

In one embodiment, the first plurality of rows of RFID tags 12 may be disposed in a first layer L1 of the array 611. The array 611 may further include a second layer L2 having a plurality of RFID tags 12 arranged in a second plurality of rows extending in the Y direction and spaced apart in the X direction. The pitch and spacing between rows of RFID tags 12 in the second layer L2 may be configured in any manner described above, for example, with respect to the first layer L1 of the array 611.

In one embodiment, RFID tags 12 of one layer may be oriented differently than RFID tags 12 of another layer. For example, the RFID tags 12 in the first L1 may be arranged having their widths extending generally in the X direction and the RFID tags 12 of the second layer L2 may be rotated approximately 90 degrees, such that the widths extend substantially in the Y direction. An effective array pitch may be provided by including first and second layers L1, L2, and, for example by offsetting positions of the RFID tags 12 in one layer relative to another layer in the array 611 and/or by orienting the RFID tags 12 in one layer differently than in the other.

Figure 17:
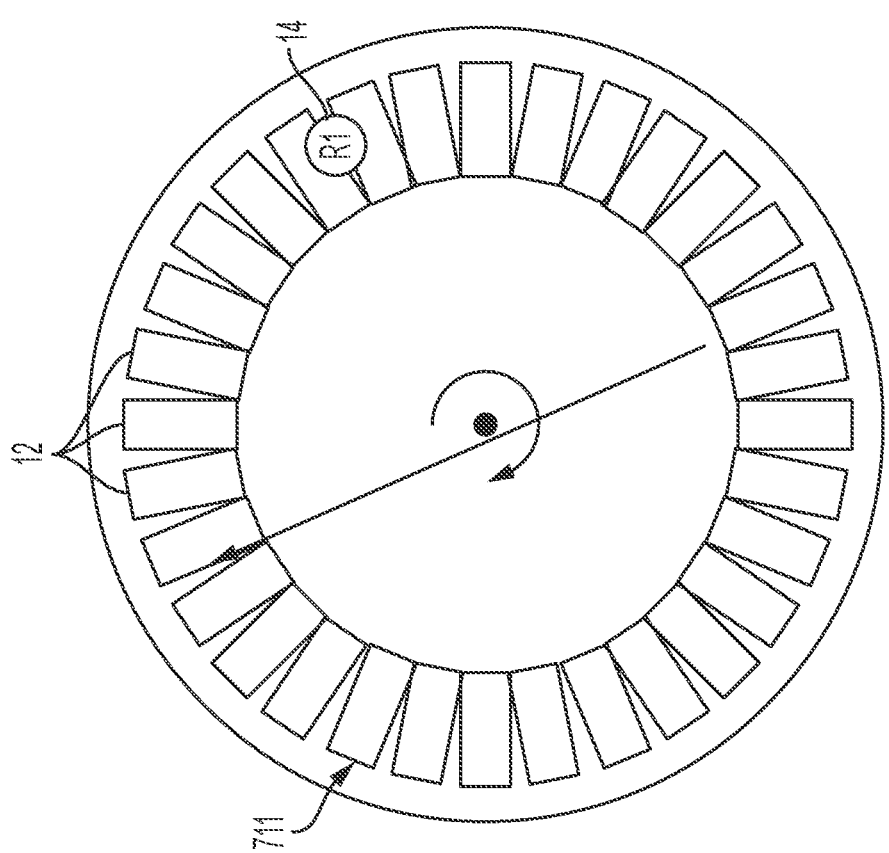
FIG. 17 is a plan view of an RFID tag array according to another embodiment.

FIG. 17 is a plan view of an array 711 according to another embodiment. The RFID tags 12 in the array 711 may be arranged generally on a circular path. In one embodiment, the RFID tags 12 are arranged generally on a common plane. In one embodiment, the array 711 includes a single layer of RFID tags 12. However, it is envisioned that multiple layers of RFID tags 12 may be provided as well, according to any of embodiments above. For example, it is envisioned that a second layer of RFID tags 12 may be disposed at substantially the same radial and circumferential positions as the RFID tags 12 of a first layer. In other embodiments, however, the RFID tags 12 of a second layer may be offset from the RFID tags 12 of the first layer in a circumferential direction, thereby providing an effective pitch that is smaller than the pitch of the RFID tags 12 of the individual layers. It is also envisioned to have RFID tags 12 positioned at different radial positions.

FIG. 18 is a perspective of an array 811 according to another embodiment. The RFID tags 12 of the array 811 may be arranged generally along a curved surface, for example, of a cylinder. The RFID tags 12 may be arranged having a predetermined pitch similar to the embodiments above. In addition, in one embodiment, a single layer of RFID tags 12 is provided in the array 811. In another embodiment, the array 811 may include one or more additional layers, where the RFID tags 12 may be positioned at substantially the same circumferential positions as the RFID tags 12 of the first layer, or alternatively, offset from the circumferential positions of the RFID tags of the first layer to provide an effective array pitch less than a pitch between adjacent RFID tags 12 of an individual layer.

FIG. 19 is a plan view of an array 911 of RFID tags 12 according to an embodiment, positioned relative to the plate 18 having the window 16 formed therein. In FIG. 19, the array 911 includes a plurality of rows of RFID tags 12 extending in the X direction. In one embodiment, the RFID tags 12 of each row are offset in the X direction relative to RFID tags 12 of another row. Accordingly, and effective array pitch may be provided that is less than the pitch between adjacent RFID tags 12 in an individual row. In one embodiment, the RFID tags 12 may be arranged in a single layer and may be positioned in a common plane.

FIG. 20 is a side view of the measurement system 10 of FIG. 19 and FIG. 21 is a perspective view of the measurement system 10 of FIG. 19. Accordingly, in FIGS. 19-21, the reader 14 is configured to read RFID tags 12 of the array 911 as the RFID tags 12 move by the window 16 of the plate 18.

FIG. 22 is a front view of the measurement system 10 according to an embodiment. As shown in FIG. 22, the carrier 40 may further include a fastener 46 configured to secure the carrier 40, and in turn the array 11, to a component of which the position is to be determined. In one embodiment, the fastener 46 may be an adhesive, such as an adhesive tape. One such adhesive tape is sold under the name VHB TM by 3M TM, however, the present disclosure is not limited to such a fastener. For example, other suitable adhesives and/or mechanical fasteners are envisioned as well.

FIGS. 23-25 are views of a measurement system 10 having an array 1011 of RFID tags 12 according to another embodiment. Referring to FIGS. 23-25, the array 1011 may include RFID tags 12 arranged in a row along a line. In one embodiment, the RFID tags 12 may have a width W of about 3 mm. With RFID tags of this size, a pitch P may be relatively small in a single row of tags 12, without providing multiple rows or layers of tags 12, while still providing suitable accurate and precise readings since multiple tags 12 are visible to the reader 14 in the window 16 of the plate 18. In one embodiment, accuracy of measurement with such RFID tags 12 may be about 1 mm.

The measurement system 10 according to the embodiments described herein may be installed on a device having a first component and a second component movable relative to the first component, or vice versa. Accordingly, one of the first component and the second component may also be referred to as a movable component. The RFID tags 12 may be disposed on one of the first component and the second component and the RFID reader 14 may be disposed on the other of the first component and the second component.

Figure 26:
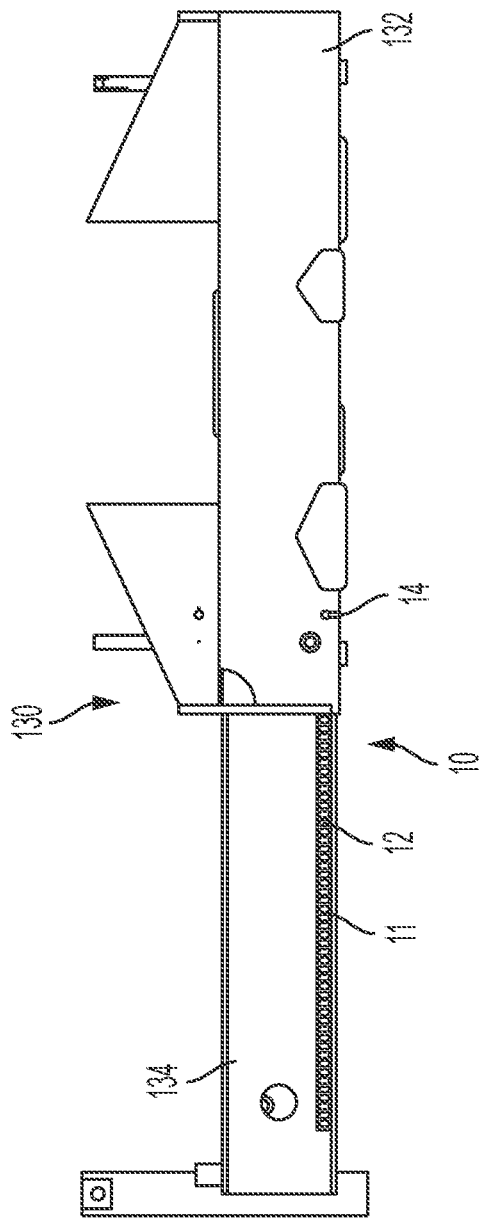
FIG. 26 is a diagram showing a measurement system installed on an outrigger assembly, according to an embodiment.
Figure 27:
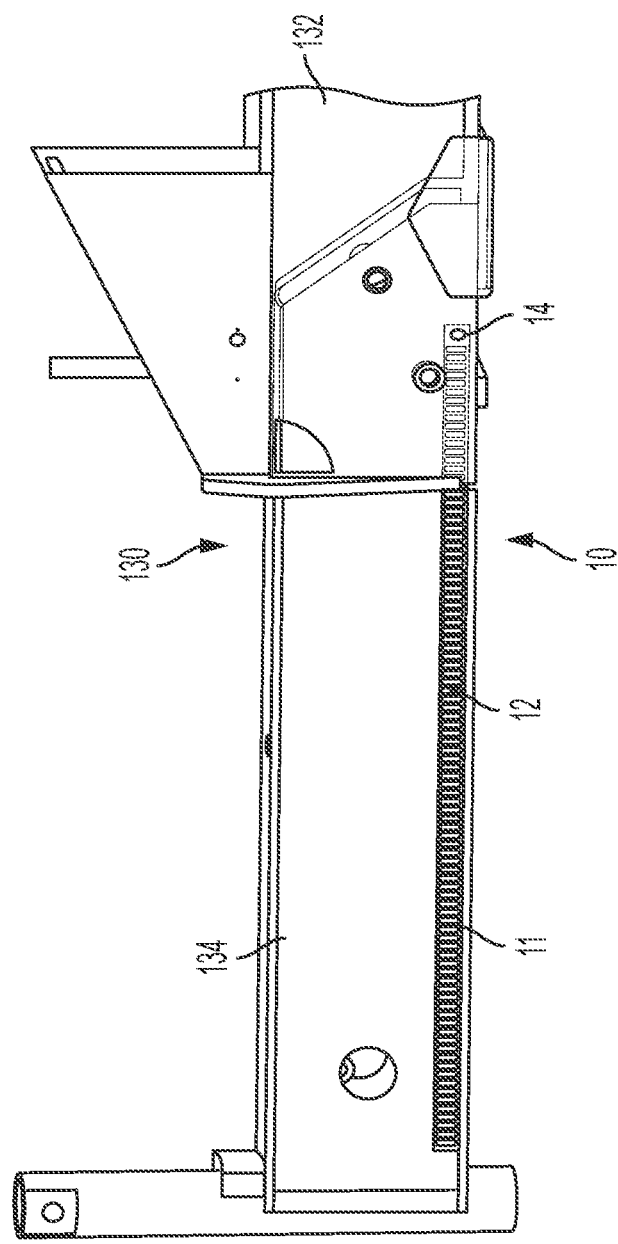
FIG. 27 is a side view showing a measurement system installed on an outrigger assembly, according to an embodiment.

FIGS. 26 and 27 show the measurement system 10 installed in an outrigger assembly 130, for example, of a crane. In the outrigger assembly 130, the first component may be, for example, a box 132 of the outrigger assembly 130 and the second component may be a beam 134 of the outrigger assembly 130 which is extendable and retractable relative to the box 132. In one embodiment, the RFID tags 12 may be disposed on the beam 134 and the reader 14 may be installed on the box 132. The RFID tags 12 may be arranged as any of the arrays described in the embodiments above, as suitable, and may be disposed on or in the carrier 40 as also described above. For example, in the outrigger assembly 130, any of the arrays described above which include a substantially linear arrangement of the RFID tags 12 may be preferred.

The plate 18 having the window 16 (not shown in FIGS. 26 and 27) may be disposed on the box 132 or formed together with the reader 14. Accordingly, the reader 14 is configured to read the RFID tags 12 on the beam 134 and the measurement system 10 is configured to determine the position, such as an extension length, of the beam 134 based on the RFID tags 12 read by the reader 14. The crane may be, for example, a mobile crane, a truck crane, a boom truck, a teleloader and the like. The outrigger assembly 130 may be used with other equipment as well, such as other construction or utility vehicles.

Figure 28:
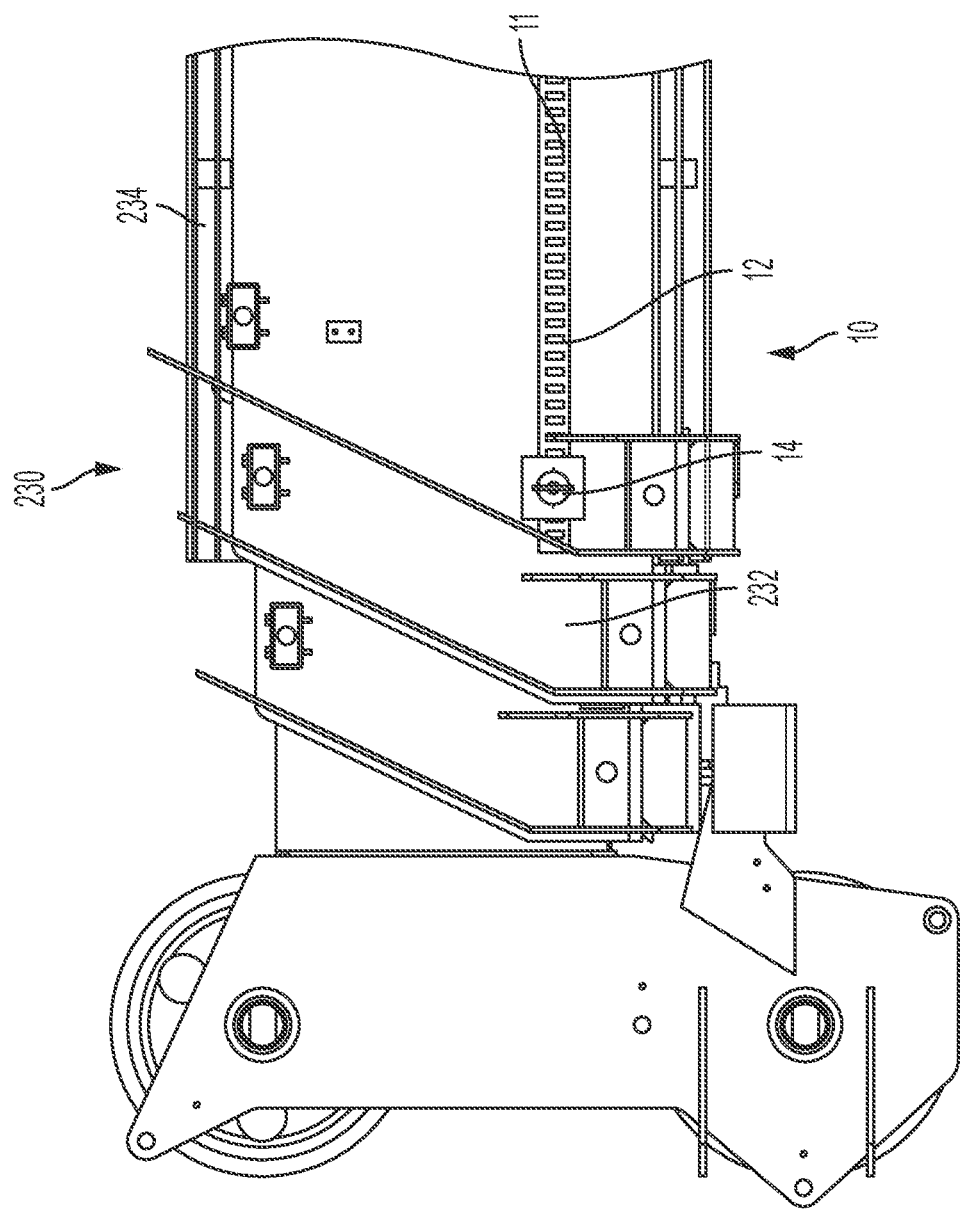
FIG. 28 is a side view showing a measurement system installed on a telescoping boom, according to an embodiment.

FIG. 28 shows the measurement system 10 installed on a telescoping boom 230, according to an embodiment. The first component may be, for example, a movable telescoping section 232 or base section 234 of the telescoping boom 230 and the second component may be another of the movable telescoping sections 232. In one embodiment, the RFID tags 12 may be disposed on a movable telescoping section 232 and the RFID reader 14 may be disposed on the base section 234, or vice versa. In one embodiment, each boom section in which another boom section is nested for telescoping movement may have either the RFID tags 12 disposed thereon or the RFID reader 14 disposed thereon, and an immediately inner adjacent inner boom section may have the other of the RFID tags 12 and the RFID reader 14 disposed thereon. In such an embodiment, each boom section, with the exception of the base section and the tip section may have both the RFID tags 12 and an RFID reader 14 configured read RFID tags 12 on an adjacent boom section. Thus, the measurement system 10, according to one embodiment, may include a plurality of RFID tag arrays 11 and a plurality of RFID readers 14. The RFID tags 12 may arranged in any of the arrays described in the embodiment above, as suitable.

In another embodiment, a single RFID reader 14 may be disposed at a free end of the base boom section and may be capable reading RFID tags 12 on all boom sections nested within the base section during telescoping movement of the inner sections.

In operation, the RFID reader 14 is configured to receive tag information from energized RFID tags 12 within range of the reader 14. The tag information may include position information. The position information may be actual, quantitative position information programmed into each RFID tag 12 indicating the position of the RFID tag 14 relative to a reference location. Alternatively, or in addition, the tag information may include identification information associated with each tag 12. The identification information could be, for example, a unique identification number such as a serial number, a unique name or other combination of numbers, letters and/or other characters which may be used to identify a particular tag 12.

Figure 29:
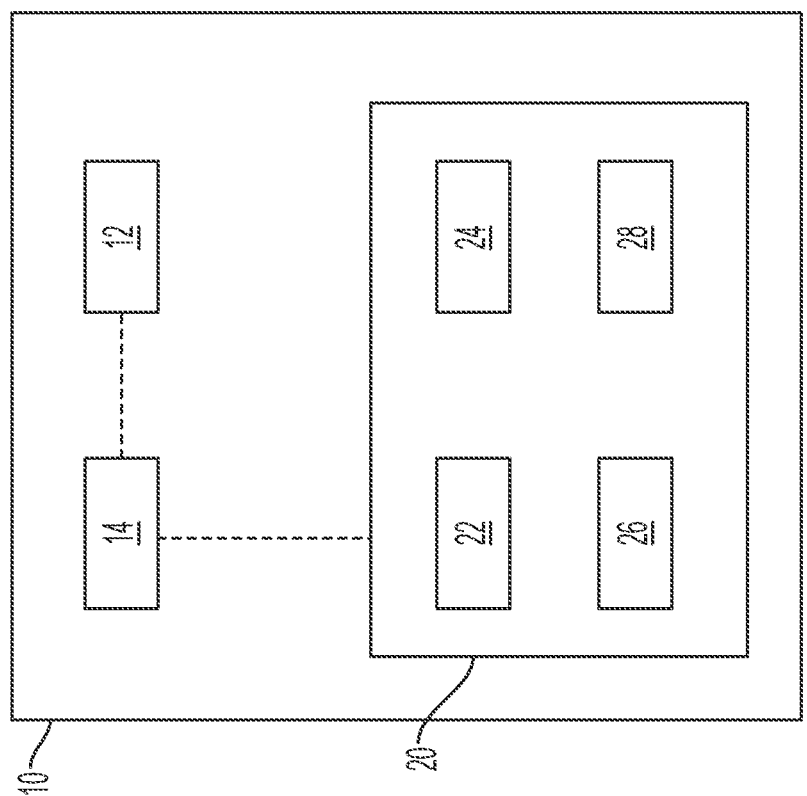
FIG. 29 is a block diagram of a measurement system and control system according to an embodiment.
Figure 30:
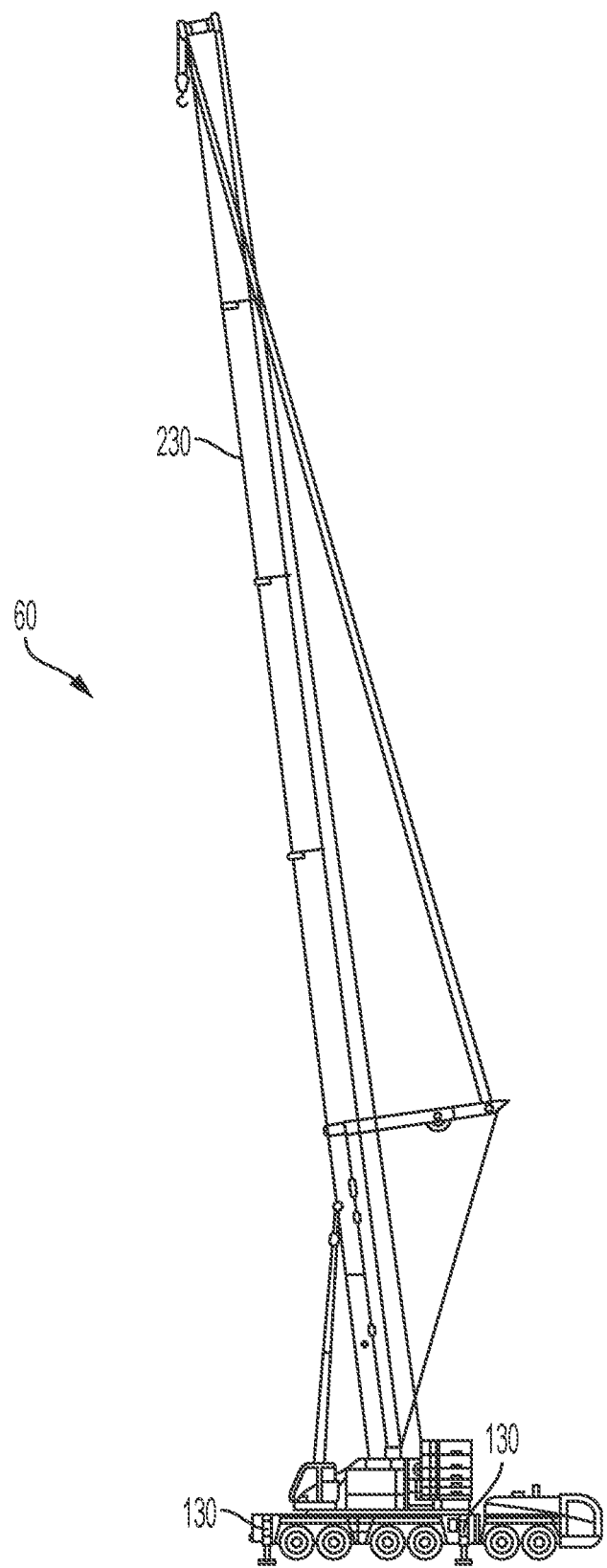
FIG. 30 is an example of a mobile crane on which a measurement system may be installed.
Figure 31:
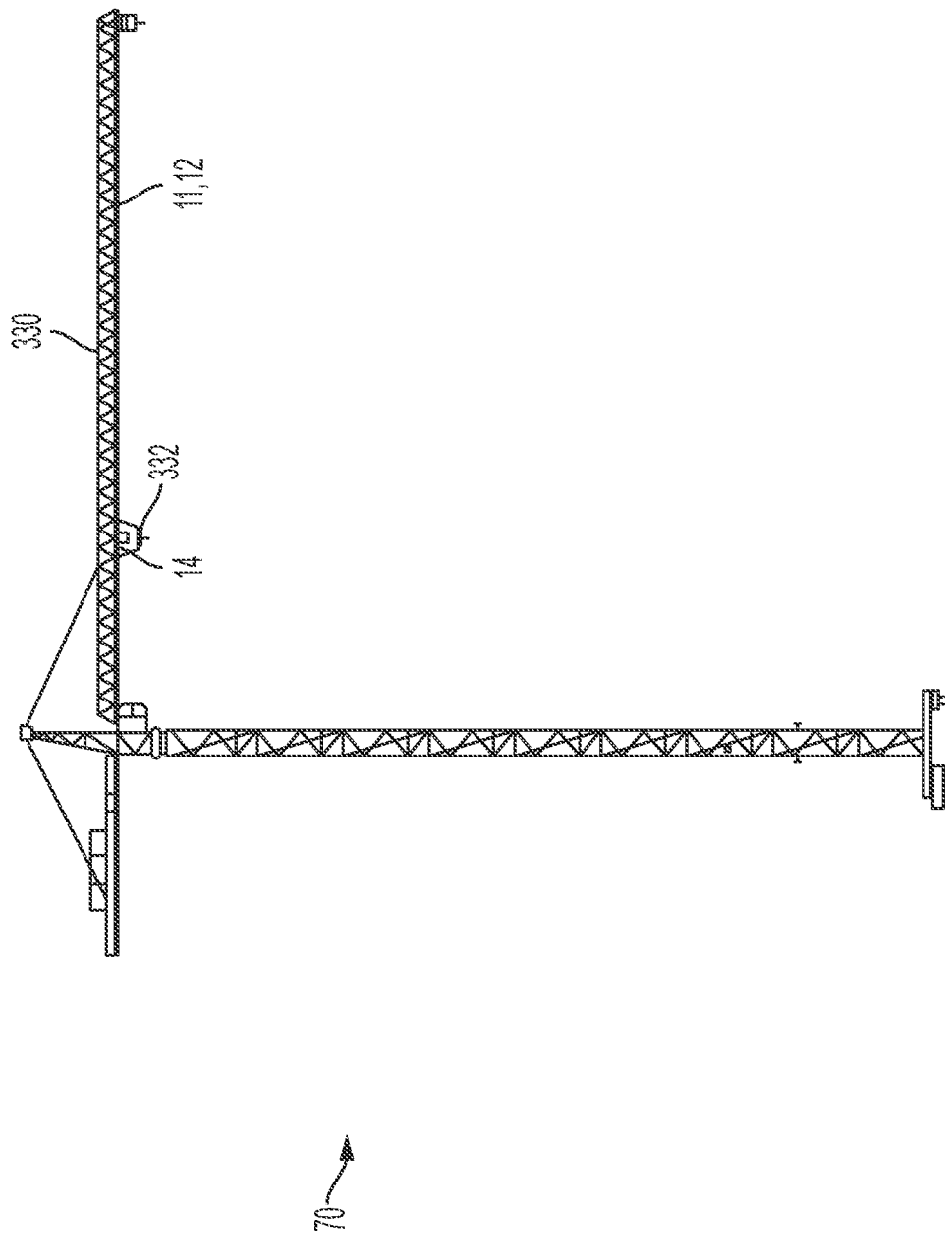
FIG. 31 is an example of a tower crane on which a measurement system may be installed.

With reference to FIG. 29, the measurement system 10 may further include, or be operatively connected to, a control system 20. The control system 20 includes a computer processor 22 and a computer readable storage medium 24. The control system 20 may further include an input/output (I/O) module 26 configured to receive and transmit information. The computer readable storage medium 24 stores program instructions 28 which, when executed by the computer processor 22, causes the computer processor 22 to generate signals to carry out one or more functions.

In one embodiment, the control system 20 is configured to determine a position of a component, such as the first component or second component, based on the tag information received by the reader 14. For example, the control system 20 may analyze position information received with the tag information, optionally adjust the position information, for example, based on a calibration procedure, and optionally convert the position information into output data in a format readily understandable to an operator. The output data may be presented, for example, on a display. In one embodiment, the control system 20 may determine the positions of the RFID tags 12 read simultaneously, or nearly simultaneously, by the reader 14, and calculate and average of the determined positions to determine the position of the a component on which the RFID tags 12 are disposed.

In one embodiment, the control system 20 may be have table stored in the computer readable storage medium 24, the table storing information corresponding to identification information received from RFID tags 12. The stored, corresponding information may be position information of the tags 12 which may be entered into the control system 20 in a calibration process or manually, for example, when positions of the RFID tags 12 are known.

In one embodiment, the control system 20 may be configured to output a control signal. The control signal may be configured to operate an output device, such as a display, alarm or the like based on the determined position. In one embodiment, the control signal may be output to a controller configured to control movement of a component. Thus, the control system 20 may control operation of a component, such as the outrigger assembly 130 or telescoping boom 230, based on the determined position. For example, the control system 20 may output a control signal to a controller to stop movement of the second component when the determined position reaches a predetermined or desired position.

In the embodiments above, the RFID tags 12 may be selected from among known RFID tags having a relatively small width W. For example, in one embodiment, RFID tags 12 having a width 'W' of about 0.5 inches are selected for use the measurement system 10. It is preferred that a width of the individual RFID tags 12 be minimized in order to minimize a pitch between adjacent RFID tags 12. In another embodiment, the RFID tags 12 may have a width W of about 3 mm. These examples are non-limiting, however, and different RFID tag widths are envisioned for use in the arrays above.

The layers of RFID tags in the arrays described above may generally be arranged in respective planes, such that RFID tags 12 of a layer lie in a common plane. However, the present disclosure is not limited to this configuration. In other embodiments, the array may substantially conform to the contour of the surface (i.e., a component surface) on which the array is installed. Additional layers may be provided in substantially corresponding contours, offset from the surface by incremental distances. Alternatively or in addition, the RFID tags 12 may be arranged in partially overlapping relationship with one another.

Moreover, in the embodiments above, it is desirable to minimize the width 'W' of the RFID tags 12 so that a greater number of RFID tags 12 may be positioned in a fixed space, thereby increasing an accuracy of measurements based on readings by the RFID reader 14. In addition, by arranging in the RFID tags 12 in layers, or with at least some overlapping portions, centers of the RFID tags 12 may be more closely positioned relative to one another to provide an effective array pitch and improve measurement accuracy.

In one embodiment, the RFID tags 12 may operate at about 13.56 MHz, but are not limited to such a frequency. In one embodiment, RFID tags 12 may be selected that operate in the High Frequency (HF) or Ultra High Frequency (UHF) radio spectrum. The RFID tags 12 may communicate according to the Near Field Communication (NFC) communication protocol.

In addition to serving as a mounting surface or support for the RFID tags 12, the base 42 of the carrier 40 serves an additional purpose. For example, it is envisioned that the RFID tags 12 of the measurement system 10 described herein may be mounted to a metal component, i.e., the first component or second component. However, metal components may adversely affect the propagation of signals emitted from the RFID tags 12. Thus, the base 42 serves to space the RFID tags 12 a suitable distance from the metal component to prevent or limit adverse effects of the metal on the propagation of the signals emitted from the RFID tags 12. Accordingly, the base 42 may be selected to have an appropriate thickness to reduce, minimize or eliminate adverse effects to signal propagation that may be caused by the adjacent metal component to which the RFID tags 12 are mounted. For example, the base 42 may have a thickness of at least 0.01 inches to allow for desired functionality when a single tag 12 is read, and a thickness of at least 0.04 inches when at least two tags 12 are read.

Various dimensions and distances may be suitable in the embodiments above. For example, in non-limiting embodiments, a thickness of the base 42 and the cover 44 may be about 0.125 inches, each. In one embodiment, the window 16 may have a width of about 5 mm in the direction of movement of the RFID tags 12. In one embodiment, a distance between the reader 14 and the window 16 may be between 0 to 0.5 inches. In one embodiment, the distance between the window 16 and the array of RFID tags 12 may be about 0.125 inches and 0.375 inches. In one embodiment, the reader 14 may be spaced from the array by about 0.125 inches to 0.825 inches. In one embodiment, the carrier 40 may have a width of about 2 inches. It is understood that these dimensions and measurements are provided for the purposes of example only, and that the present disclosure is not limited these examples. Other distances between individual components and dimensions of components not listed above, or falling outside of the above-noted ranges are envisioned and fall within the scope of this disclosure so long as the measurement system 10 operates according to the principles described herein and the same or substantially the same results and benefits are realized.

In one embodiment, the measurement system 10 may be packaged as a modular unit including the control system 20, the RFID tags 12 and the RFID reader 14. Accordingly, the measurement system 10 may be easily installed on removed from various components or systems.

The measurement system 10 according to the described herein may be suitable in a variety of applications. For example, the measurement system 10 may be implemented in any of a mobile crane 60, tower crane 70 and/or crawler crane 80 on first and second components where one component is movable relative to the other. For example, the measurement system 10, having for instance, the array 611, 711, 811 may be used in conjunction with components of a rotating bed, hoist, counterweight assembly or other rotatable components or component movable in multiple directions which will be appreciated by those having skill in the art, while substantially linear arrays, such as 11, 111, 211, 311, 411, 511 may be used in conjunction with components which are linearly movable, such as the outrigger assembly 130, the telescoping boom 230 and/or a trolley 332 movable along the jib 330 of the tower crane 70.

Further, in the embodiments above, the window 16 may serve as a filter to limit a number of RFID tags 12 from which the RFID reader 14 receives signals with the tag information, while still allowing for accurate measurements and position determinations. For example, in an RFID array 11 with a relatively large number of closely positioned RFID tags 12, such as those described above, the RFID reader 14 may energize a relatively large number of RFID tags 12 at a given time, and thus, may receive the signals with tag information, nearly simultaneously from all of the energized RFID tags 12. This may require substantial processing power in the control system 20 to process all of the received tag information and determine the position of the RFID tags 12 and the movable component. However, with the plate 18, made of material through which signals are generally non-transmissible, fewer RFID tags 12 may be energized by the RFID reader 14 and/or fewer signals may be received at the RFID reader 14 from the RFID tags 12.

Thus, the plate 18 and window 16 may have the effect of reducing the read area of the reader 14 based on the size of the window 16. However, in an array 11 with a relatively small pitch P or effective array pitch $P_{array}$, the RFID reader 14 may still receive signals from one or more relatively closely arranged RFID tags 12, such as those described in the embodiments above, thereby maintaining accuracy of the measurements while reducing necessary processing power and operations carried out by the control system 20.

It is understood that the RFID arrays are not limited to those described above. Different arrangements of RFID tags 12 are envisioned. For example, it is also envisioned that the RFID array may include a plurality of RFID tags arranged substantially along a curve or arc, a segment of a circle or oval, along a zig-zag type path, and other suitable arrangements.

In the embodiments above, the measurement system 10 is configured to determine a position of a first or second component based on information read from one or more RFID tags 12 by the RFID reader 14. The position measurement may be, for example, length of extension of the component 32, 34 or a position of the component in a coordinate system, based on information received from an RFID tag or tags 12. The determined length may be provided as a distance, a percentage of full extension, or both. Further, the measurement system 10 may qualitatively determine a position of the first or second component based on the received signal or signals. For example, the measurement system 10 may determine that the extendable component is fully extended, fully retracted or extended to a predetermined interval, such as half-extended or quarter-extended. Such determinations may be made by the control system 20. That is, the control system 20 may process the received information, convert the information, and output a length of measurement or position of the extendable component.

The measurement system 10 described in the embodiments above may be operably and communicably connected to a crane control system (not shown). Information regarding the position or measured length of extension of the component, for example an outrigger beam or boom section, may be used by the crane control system to calculate a load chart, for example. Alternatively, or in addition, the measurement system 10 may be connected to a remote system (not shown) or centralized system (not shown) where the position or measured length of extension of the extendable component may be used, for example, to calculate a load chart.

The measurement system 10 of the embodiments above may be implemented in or used together mechanical systems such as telescopic cylinders, fork trucks, robotics, assembly lines, railways, linear actuators and other systems having moving components, or sub-systems of the such systems. In addition, the measurement system 10 described herein may be used in to measure lengths over any distance, including very large distances, which the array of RFID tags 12 is positioned.

It is understood the various features from any of the embodiments above are usable together with the other embodiments described herein. Further, it is understood that same or similar terminology used across the different embodiments above refers to the same or similar component, with the exception of any differences described or shown in the figures.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A measurement system comprising:
   a plurality of RFID tags, each RFID tag configured to output tag information, each RFID tag having a width and spaced from an adjacent RFID tag by a pitch;
   a single RFID reader configured to read the tag information from at least one RFID tag of the plurality of RFID tags;
   a plate having a window disposed between the RFID reader and the plurality of RFID tags, wherein the window is dimensioned to control a transmission range between the RFID tags and the RFID reader;
   a carrier to which the plurality of RFID tags are mounted; and
   a control system operably connected to the RFID reader, the control system configured to determine a position of the at least one RFID tag based on the tag information,
   wherein the RFID tags are disposed along a line in abutting relationship with one another.

2. The measurement system of claim 1, wherein the carrier includes a base and a cover and the plurality of RFID tags are disposed between the base and the cover.

3. The measurement system of claim 1, wherein the RFID reader is configured to read the tag information from two or more RFID tags substantially simultaneously, and the control system is configured to determine a position of the two or more RFID tags based on the tag information.

4. A measurement system comprising:
   a plurality of RFID tags, each RFID tag configured to output tag information, each RFID tag having a width and spaced from an adjacent RFID tag by a pitch;
   a single RFID reader configured to read the tag information from at least one RFID tag of the plurality of RFID tags;
   a plate having a window disposed between the RFID reader and the plurality of RFID tags, wherein the window is dimensioned to control a transmission range between the RFID tags and the RFID reader;
   a carrier to which the plurality of RFID tags are mounted; and
   a control system operably connected to the RFID reader, the control system configured to determine a position of the at least one RFID tag based on the tag information,
   wherein the RFID tags are disposed in a first layer and a second layer in an overlapping relationship with one another.

5. A measurement system for determining a position of a movable component, the movable component being one of a first component and second component movable relative to the other of the first component and the second component, the system comprising:
   a plurality of RFID tags arranged on one of the first component and the second component, each tag configured to output a signal;
   a carrier on which the plurality of RFID tags are arranged;
   an RFID reader arranged on the other of the first component or the second component and configured to read the signal;
   a plate having a window disposed between the RFID reader and the plurality of RFID tags, wherein the window is dimensioned to control a transmission range between the RFID tags and the RFID reader; and
   a control system operatively connected to the reader, the control system configured to determine a position of an RFID tag of the plurality of RFID tags based on the signal,
   wherein the plurality of RFID tags are arranged substantially along a line in abutting relationship.

6. The measurement system of claim 5, wherein the second component moves telescopically relative to the first component.

7. The measurement system of claim 6, wherein the first component is an outrigger box and the second component is an outrigger beam.

8. The measurement system of claim 6, wherein the first component is an outer boom section of a telescoping boom and the second component is an inner boom section of the telescoping boom.

9. The measurement system of claim 5, wherein the RFID reader is configured to read at least two RFID tags nearly simultaneously and the control system is configured to determine a position of the movable component based on the signal of the at least two RFID tags.

10. The measurement system of claim 5, wherein the carrier comprises a base configured to be secured to one of the first component and the second component and having a thickness configured to space the RFID tags from the first component or second component by a predetermined distance.

11. A measurement system for determining a position of a movable component, the movable component being one of a first component and second component movable relative to the other of the first component and the second component, the system comprising:
    a plurality of RFID tags arranged on one of the first component and the second component, each tag configured to output a signal;
    a carrier on which the plurality of RFID tags are arranged;

an RFID reader arranged on the other of the first component or the second component and configured to read the signal;
a plate having a window disposed between the RFID reader and the plurality of RFID tags, wherein the window is dimensioned to control a transmission range between the RFID tags and the RFID reader; and
a control system operatively connected to the reader, the control system configured to determine a position of an RFID tag of the plurality of RFID tags based on the signal,
wherein the plurality of RFID tags at least partially overlap one another.

12. The measurement system of claim 11, wherein the first component is a rotating section of a rotating bed and the second component is a fixed section of a rotating bed.

13. The measurement system of claim 11, wherein the plurality of RFID tags are arranged substantially along a circle, arc or curve.

14. The measurement system of claim 11, wherein the plurality of RFID tags are arranged along a cylindrical wall.

15. A measurement system for determining a position of a movable component, the movable component being one of a first component and second component movable relative to the other of the first component and the second component, the system comprising:
a plurality of RFID tags arranged on one of the first component and the second component, each tag configured to output a signal;
a carrier on which the plurality of RFID tags are arranged;
an RFID reader arranged on the other of the first component or the second component and configured to read the signal;
a plate having a window disposed between the RFID reader and the plurality of RFID tags, wherein the window is dimensioned to control a transmission range between the RFID tags and the RFID reader; and
a control system operatively connected to the reader, the control system configured to determine a position of an RFID tag of the plurality of RFID tags based on the signal,
wherein a load chart is calculated based on the determined position.

16. A measurement system for determining a position of a movable component, the movable component being one of a first component and second component movable relative to the other of the first component and the second component, the system comprising:
a plurality of RFID tags arranged on one of the first component and the second component, each tag configured to output a signal;
a carrier on which the plurality of RFID tags are arranged;
an RFID reader arranged on the other of the first component or the second component and configured to read the signal;
a plate having a window disposed between the RFID reader and the plurality of RFID tags, wherein the window is dimensioned to control a transmission range between the RFID tags and the RFID reader; and
a control system operatively connected to the reader, the control system configured to determine a position of an RFID tag of the plurality of RFID tags based on the signal,
wherein the first component is a tower crane trolley and the second component is a tower crane jib, wherein the trolley is movable along the jib.

17. A measurement system for determining a position of a movable component, the movable component being one of a first component and second component movable relative to the other of the first component and the second component, the system comprising:
a plurality of RFID tags arranged on one of the first component and the second component, each tag configured to output a signal;
a carrier on which the plurality of RFID tags are arranged;
an RFID reader arranged on the other of the first component or the second component and configured to read the signal;
a plate having a window disposed between the RFID reader and the plurality of RFID tags, wherein the window is dimensioned to control a transmission range between the RFID tags and the RFID reader; and
a control system operatively connected to the reader, the control system configured to determine a position of an RFID tag of the plurality of RFID tags based on the signal,
wherein the plurality of RFID tags includes a first plurality of RFID tags extending along a first direction and a second plurality of RFID tags extending along a second direction different from the first direction, and
wherein the first plurality of RFID tags have a first orientation and the second plurality of RFID tags have a second orientation different than the first orientation.

* * * * *